Figure 1:
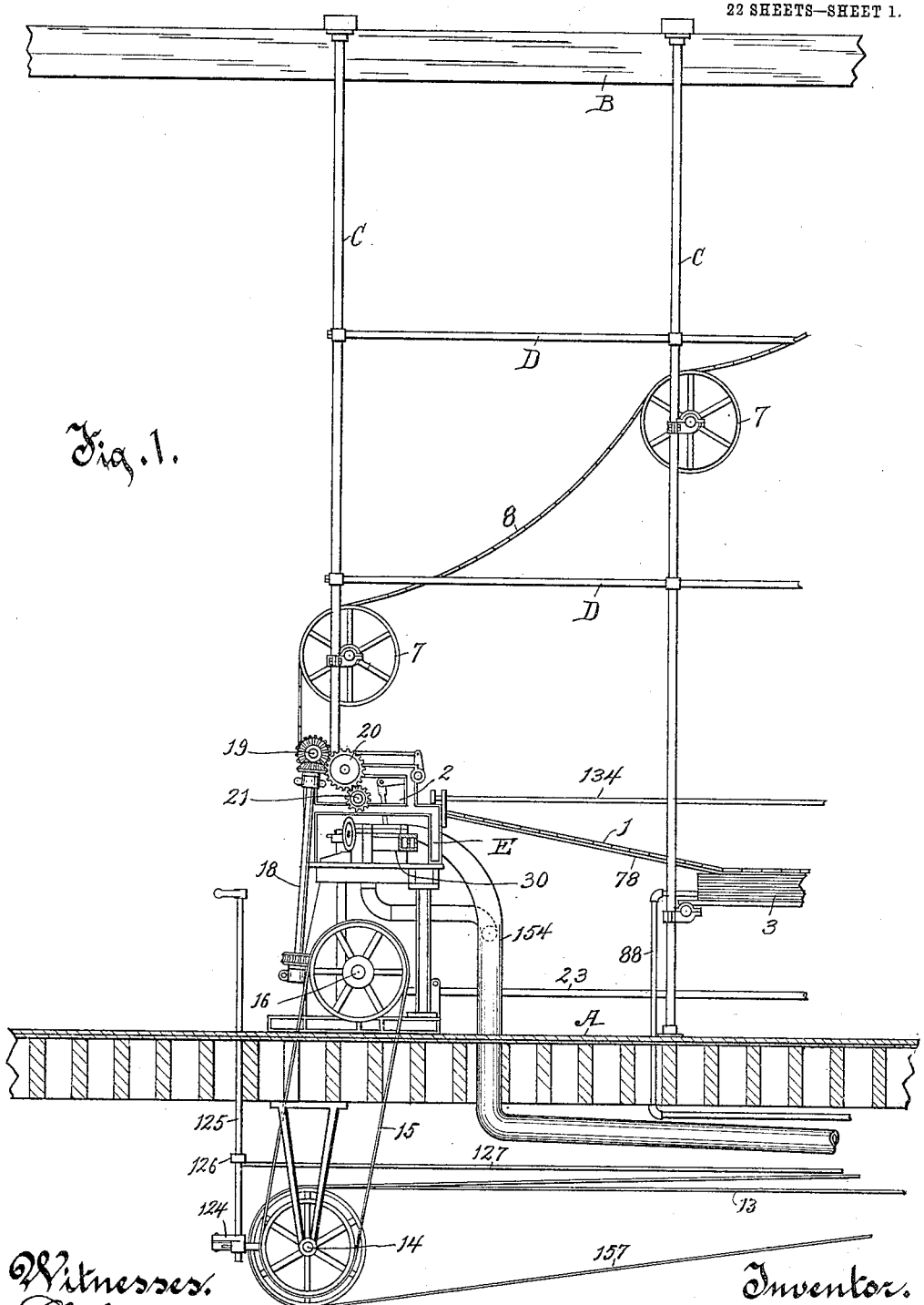

No. 816,634. PATENTED APR. 3, 1906.
W. H. WYMAN.
MATCH MACHINE.
APPLICATION FILED APR. 3, 1899.

22 SHEETS—SHEET 1.

Witnesses.
C. H. Keeney.
Anna C. Faust.

Inventor.
William H. Wyman
By Benedict & Morsell
Attorneys.

No. 816,634. PATENTED APR. 3, 1906.
W. H. WYMAN.
MATCH MACHINE.
APPLICATION FILED APR. 3, 1899.
22 SHEETS—SHEET 5.
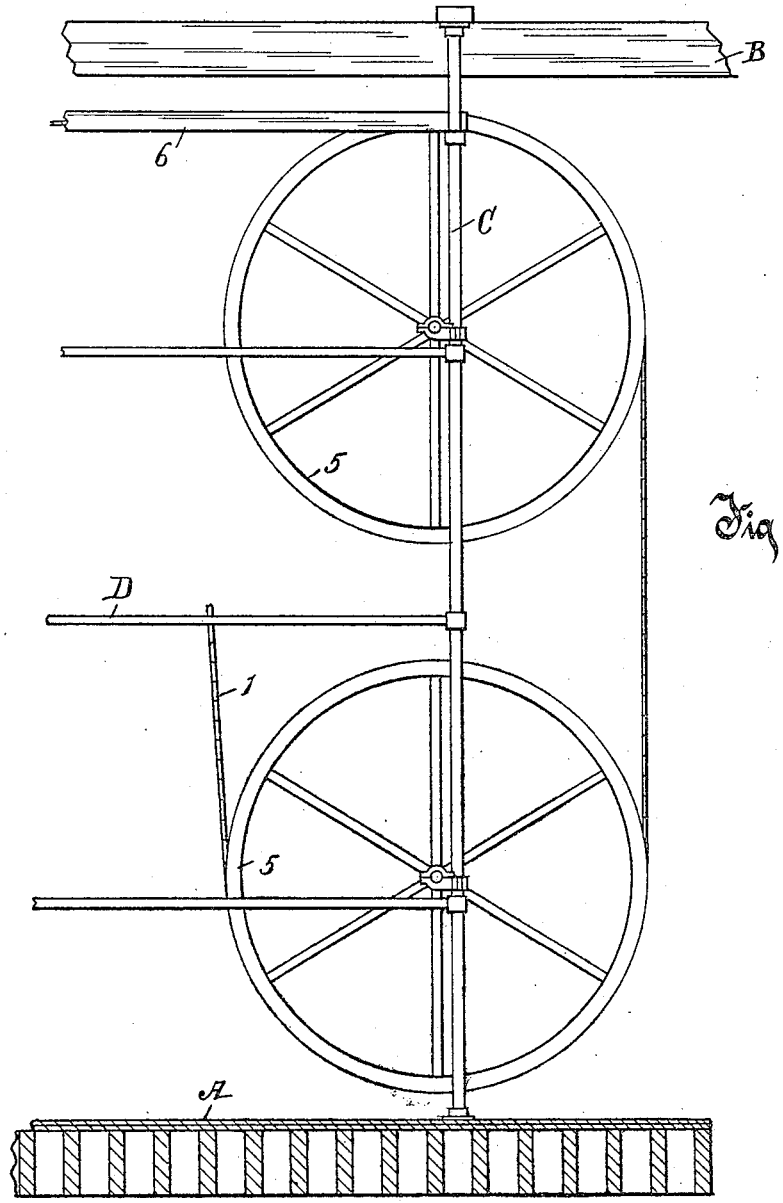
Fig. 5.
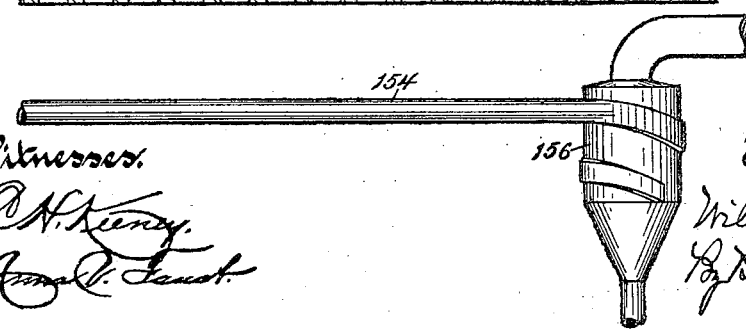
Witnesses.
Inventor.
William H. Wyman
By Benedict Morsell
Attorneys.

No. 816,634. PATENTED APR. 3, 1906.
W. H. WYMAN.
MATCH MACHINE.
APPLICATION FILED APR. 3, 1899.

22 SHEETS—SHEET 6.

Witnesses.

Inventor.
William H. Wyman
By Benedict & Morsell
Attorneys.

No. 816,634.  
PATENTED APR. 3, 1906.  
W. H. WYMAN.  
MATCH MACHINE.  
APPLICATION FILED APR. 3, 1899.

22 SHEETS—SHEET 7.

No. 816,634. PATENTED APR. 3, 1906.
W. H. WYMAN.
MATCH MACHINE.
APPLICATION FILED APR. 3, 1899.

22 SHEETS—SHEET 9.

Witnesses.
Inventor.
William H. Wyman
By Benedict & Morsell
Attorneys.

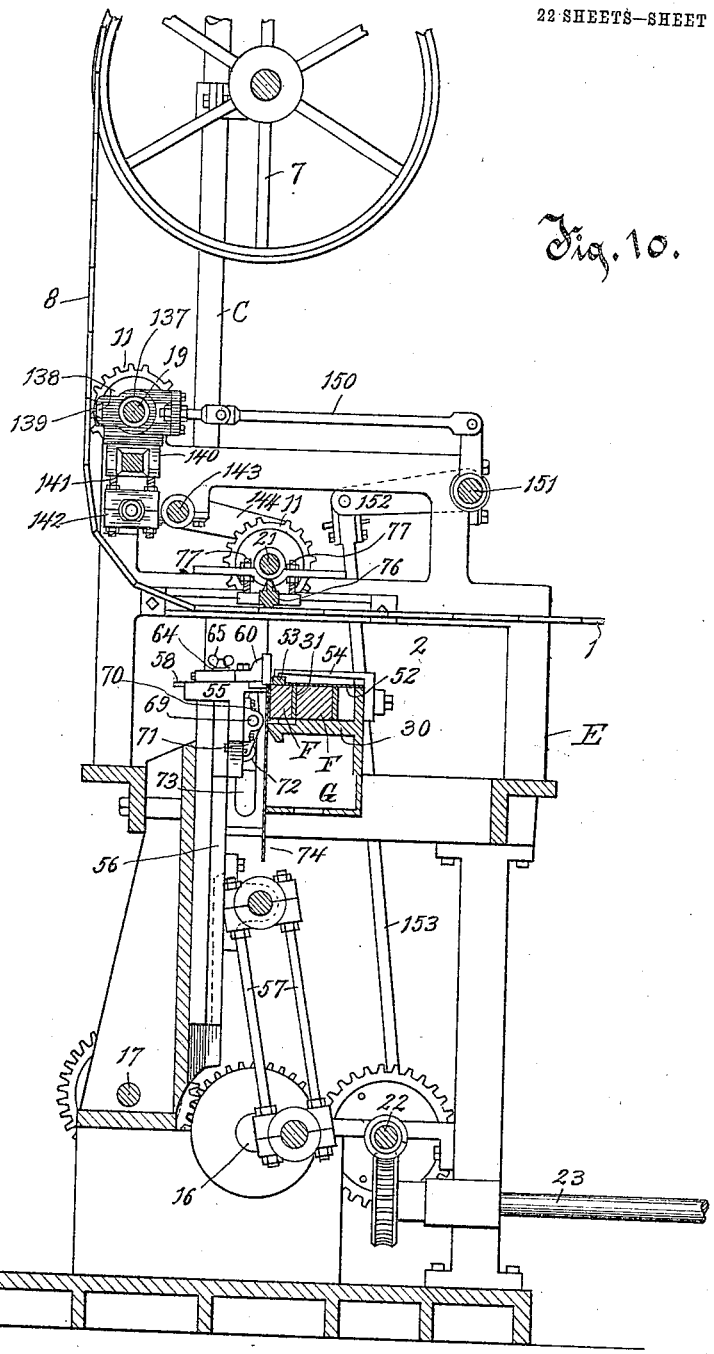

No. 816,634.
PATENTED APR. 3, 1906.
W. H. WYMAN.
MATCH MACHINE.
APPLICATION FILED APR. 3, 1899.
22 SHEETS—SHEET 11.
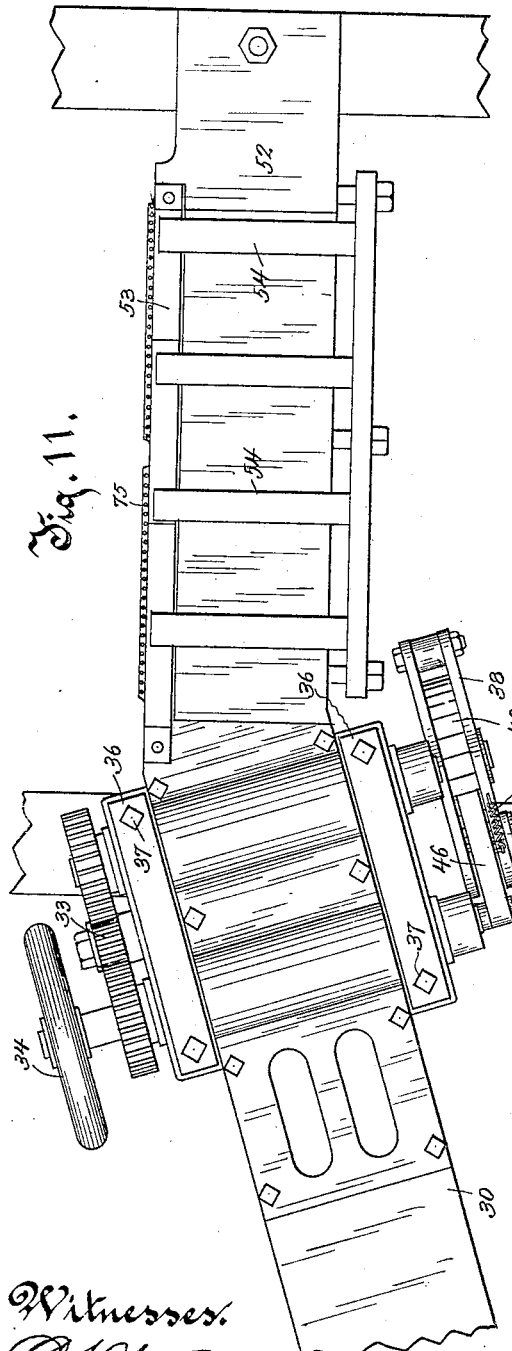
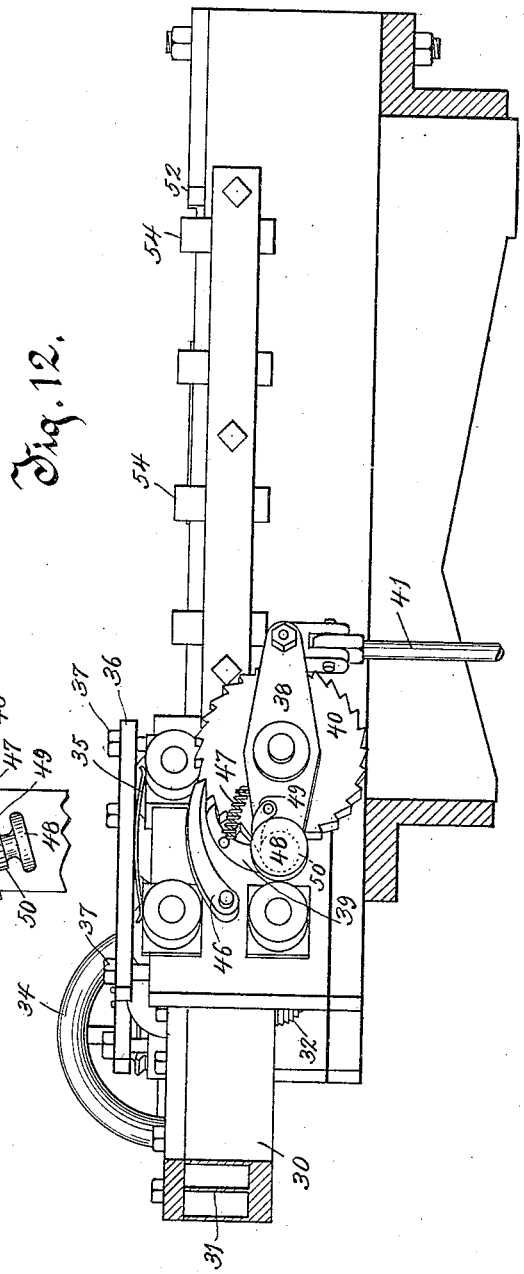
Witnesses.
Inventor.
William H. Wyman
By Benedict Morsell
Attorneys.

No. 816,634. PATENTED APR. 3, 1906.
W. H. WYMAN.
MATCH MACHINE.
APPLICATION FILED APR. 3, 1899.
22 SHEETS—SHEET 12.
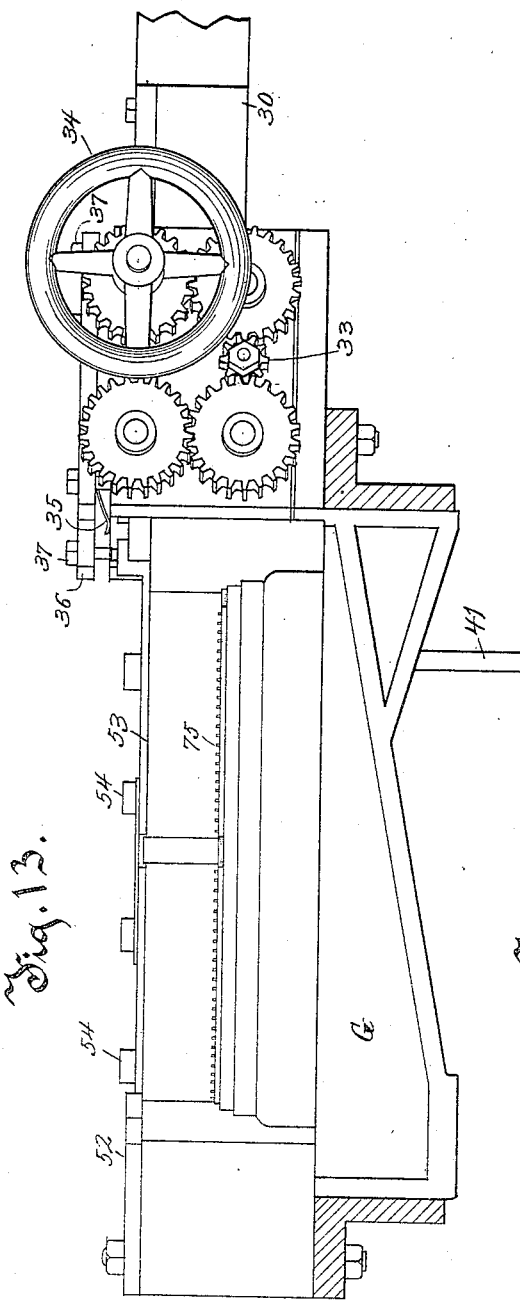
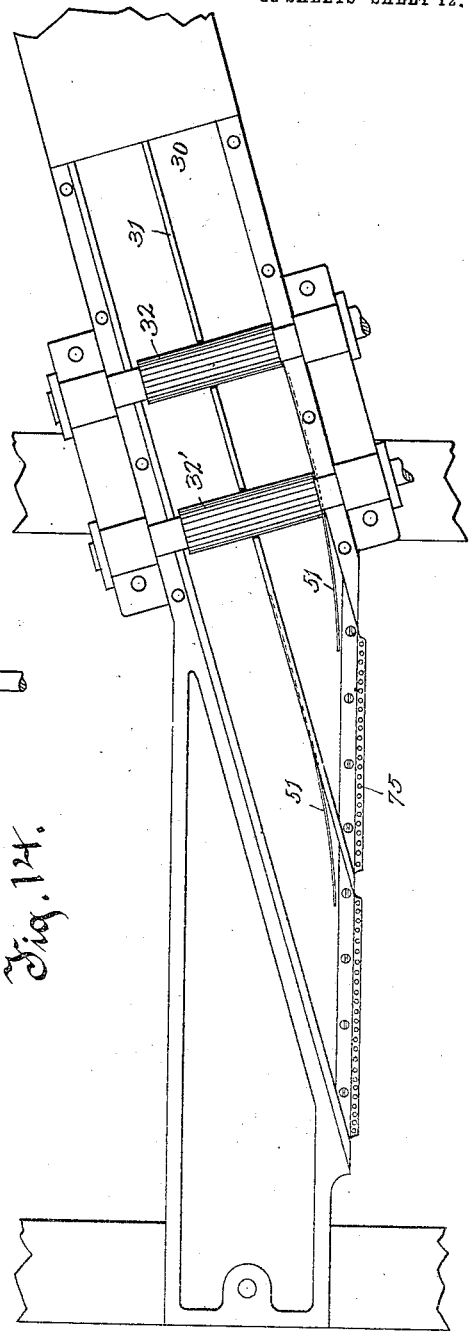

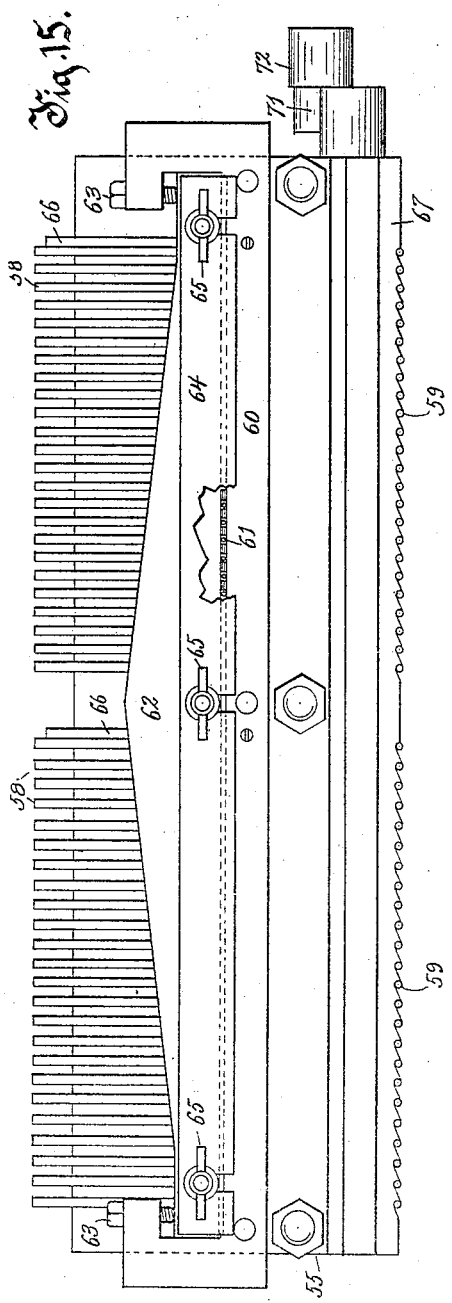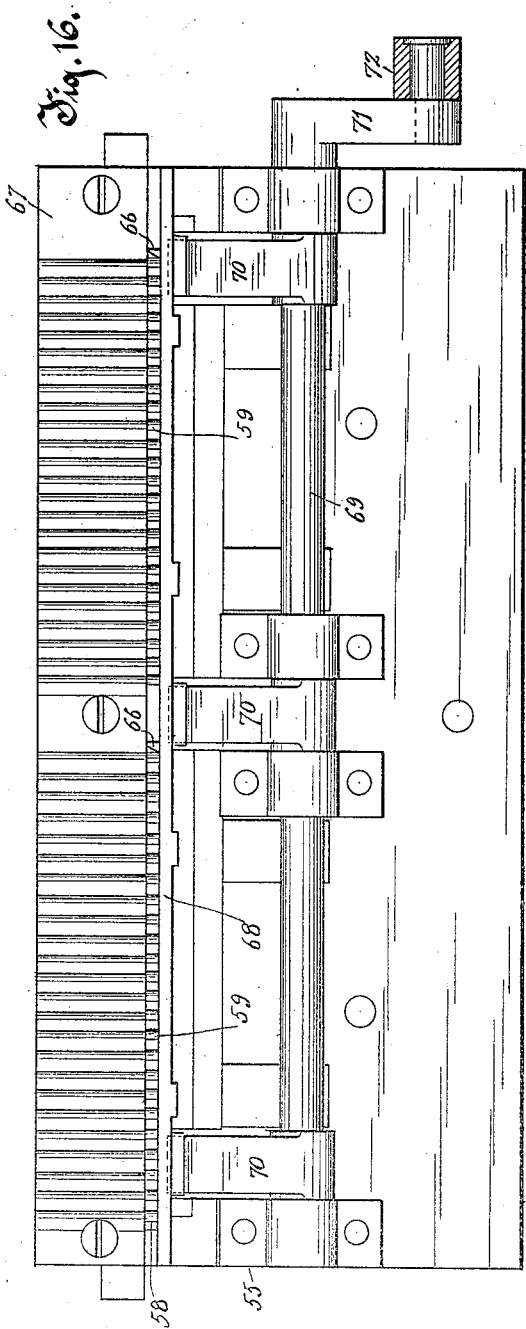

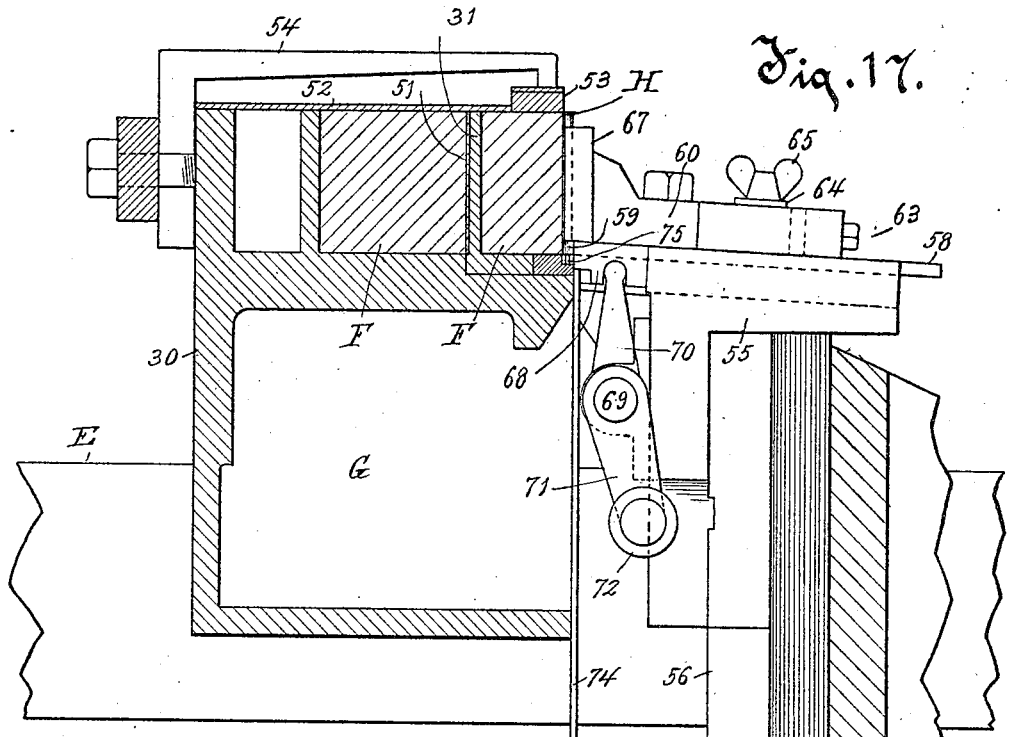

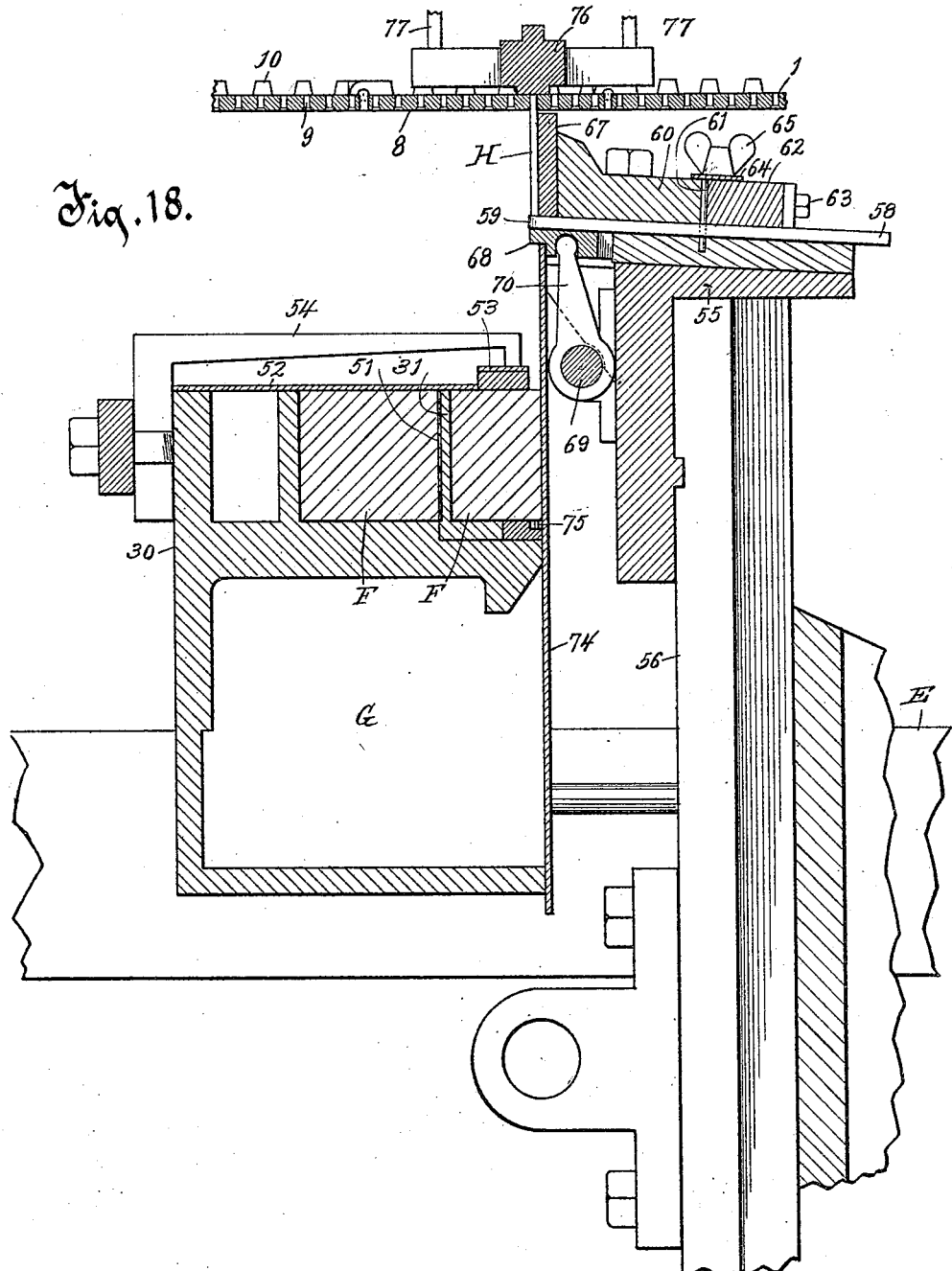

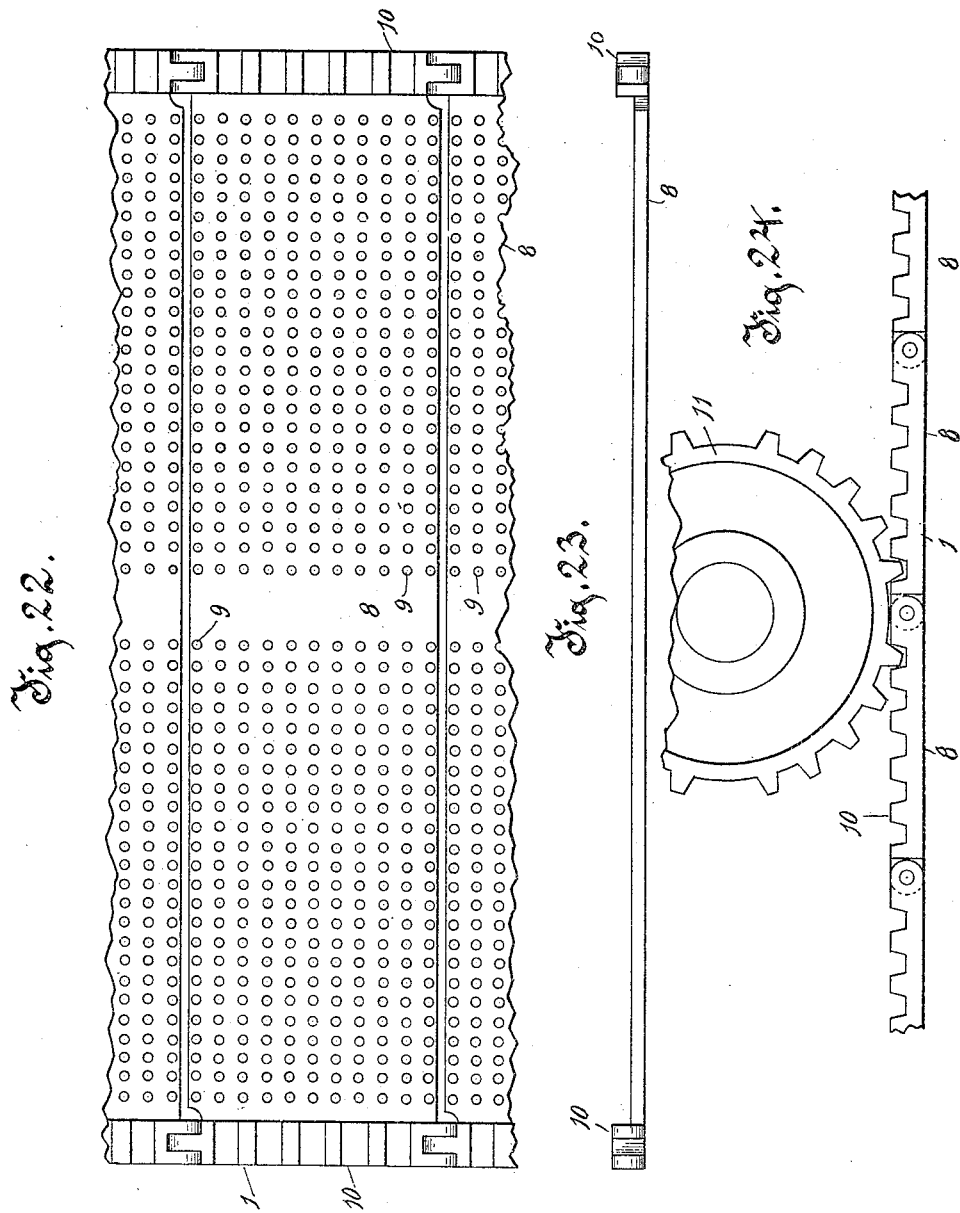

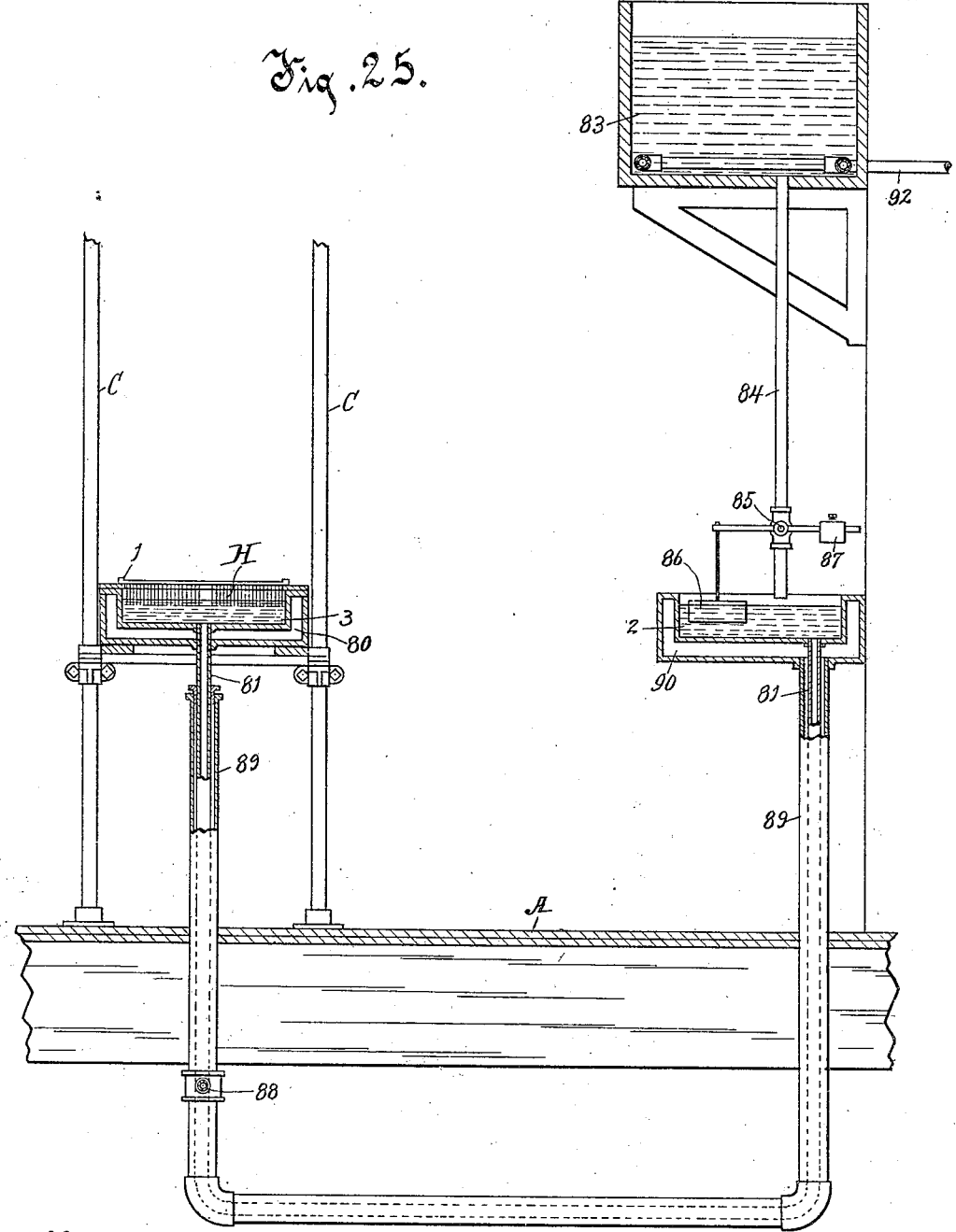

No. 816,634. PATENTED APR. 3, 1906.
W. H. WYMAN.
MATCH MACHINE.
APPLICATION FILED APR. 3, 1899.
22 SHEETS—SHEET 18.
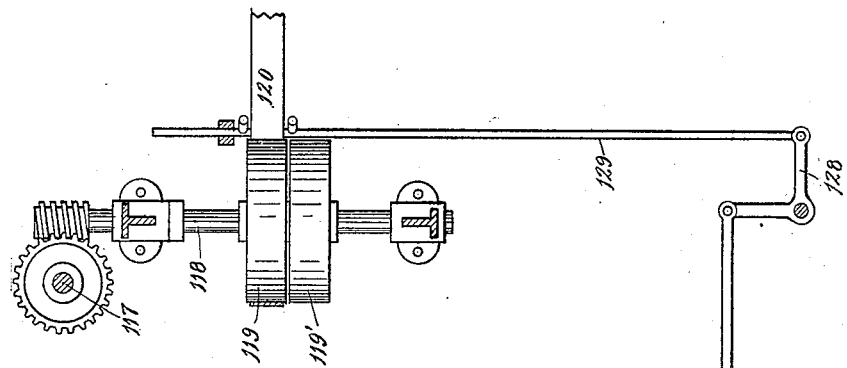
Fig. 26.
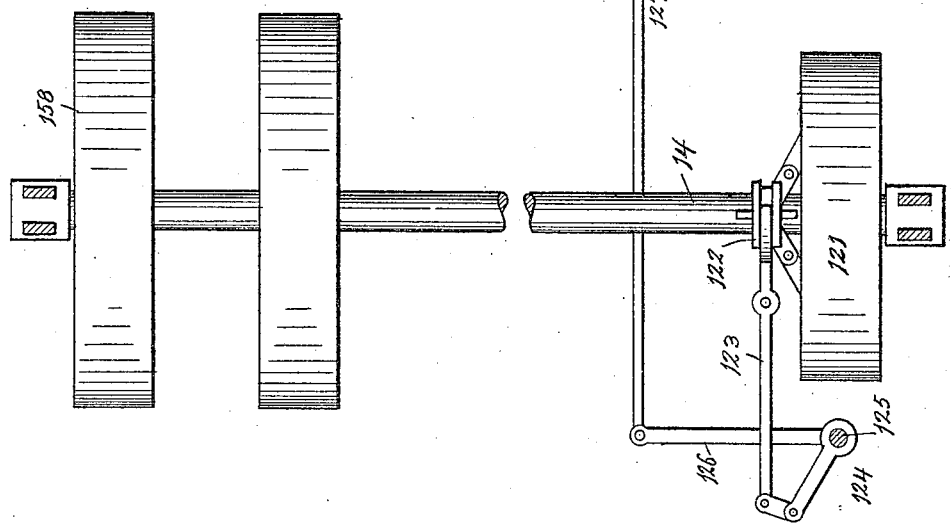
Witnesses.
Inventor.
William H. Wyman
By Benedict & Morsell
Attorneys.

No. 816,634.  
PATENTED APR. 3, 1906.

W. H. WYMAN.  
MATCH MACHINE.  
APPLICATION FILED APR. 3, 1899.

22 SHEETS—SHEET 20.

Witnesses.  
Inventor.  
William H. Wyman  
By Benedict & Morsell  
Attorneys.

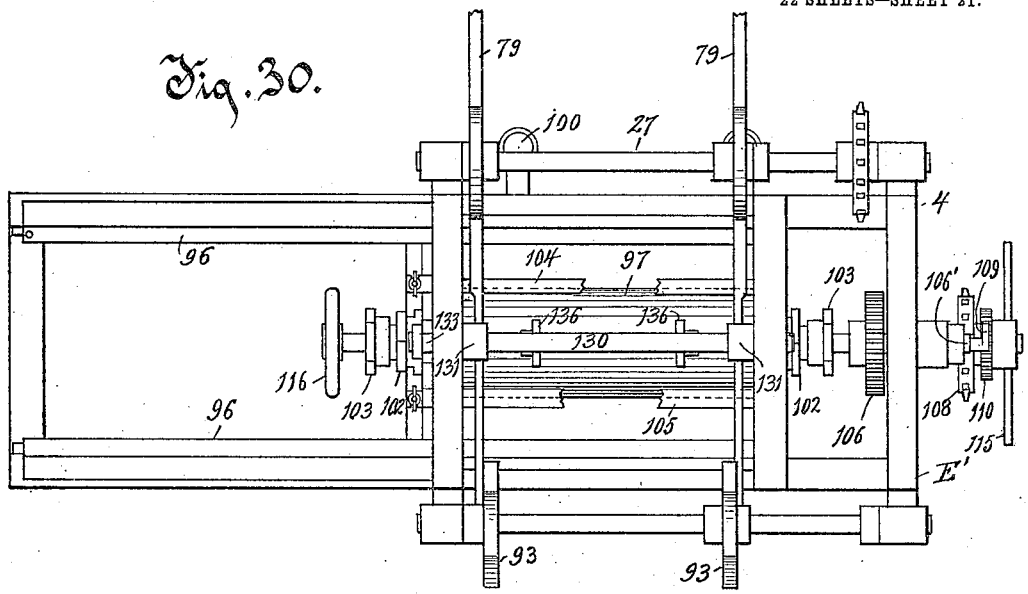
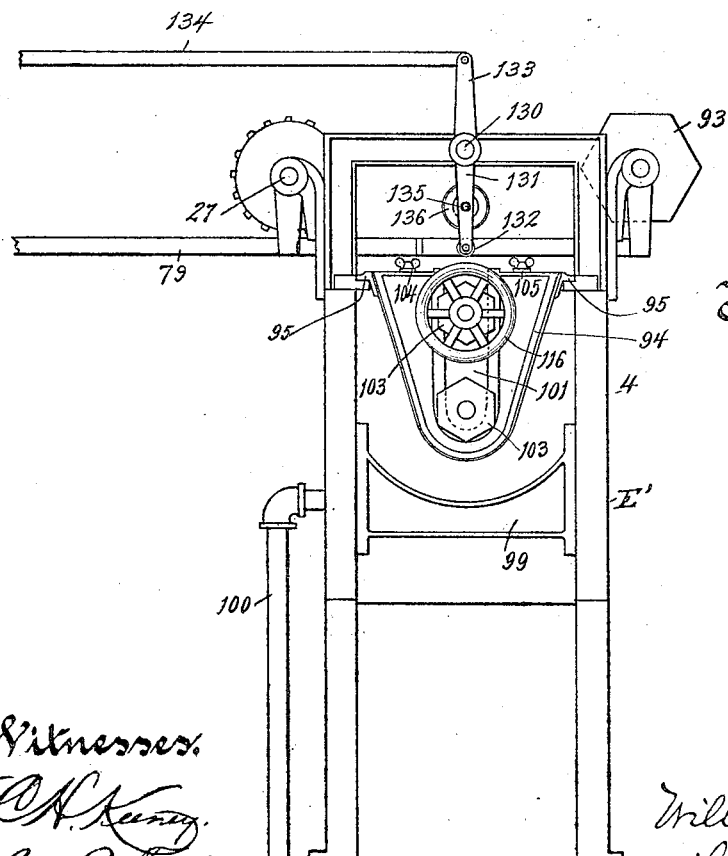

No. 816,634.

PATENTED APR. 3, 1906.

W. H. WYMAN.
MATCH MACHINE.
APPLICATION FILED APR. 3, 1899.

22 SHEETS—SHEET 22.

Witnesses.

Inventor.
William H. Wyman
By Benedict Morsell
Attorneys.

UNITED STATES PATENT OFFICE.

WILLIAM H. WYMAN, OF OSHKOSH, WISCONSIN, ASSIGNOR, BY MESNE ASSIGNMENTS, TO UNION MATCH COMPANY, OF DULUTH, MINNESOTA, A CORPORATION OF MINNESOTA.

MATCH-MACHINE.

No. 816,634.  Specification of Letters Patent.  Patented April 3, 1906.

Application filed April 3, 1899. Serial No. 711,583.

*To all whom it may concern:*

Be it known that I, WILLIAM H. WYMAN, of Oshkosh, in the county of Winnebago and State of Wisconsin, have invented a new and useful Improvement in Match-Machines, of which the following is a description, reference being had to the accompanying drawings, which are a part of this specification.

My invention relates to improvements in machines for the manufacture of matches, the improvements relating to machines of a class that are adapted to cut the match-sticks from blocks of wood that are fed to the machines, to apply to a part of the sticks a burning material, and to complete the matches by applying a head thereto of readily-ignitible composition.

The machine to which my improvements relate has mechanism for feeding the blocks of wood cut to proper lengths to the stick-cutting devices, the stick-cutting devices and mechanism, mechanism to insert the sticks into a flexible endless carrier, devices to support the carrier, and mechanism to move or cause the carrier to travel ahead continuously and non-intermittingly, devices for holding and applying paraffin or similar burning material, means for applying the ignitible composition to and forming the match-heads on the sticks, mechanism for discharging the matches from the carrier, and other devices and mechanism incidental to the foregoing-enumerated devices, and mechanisms necessary or convenient for the satisfactory working of the complete machine.

The invention consists of the novel parts and combinations of parts and mechanism, as herein described and claimed, or their equivalents.

Figure 6:
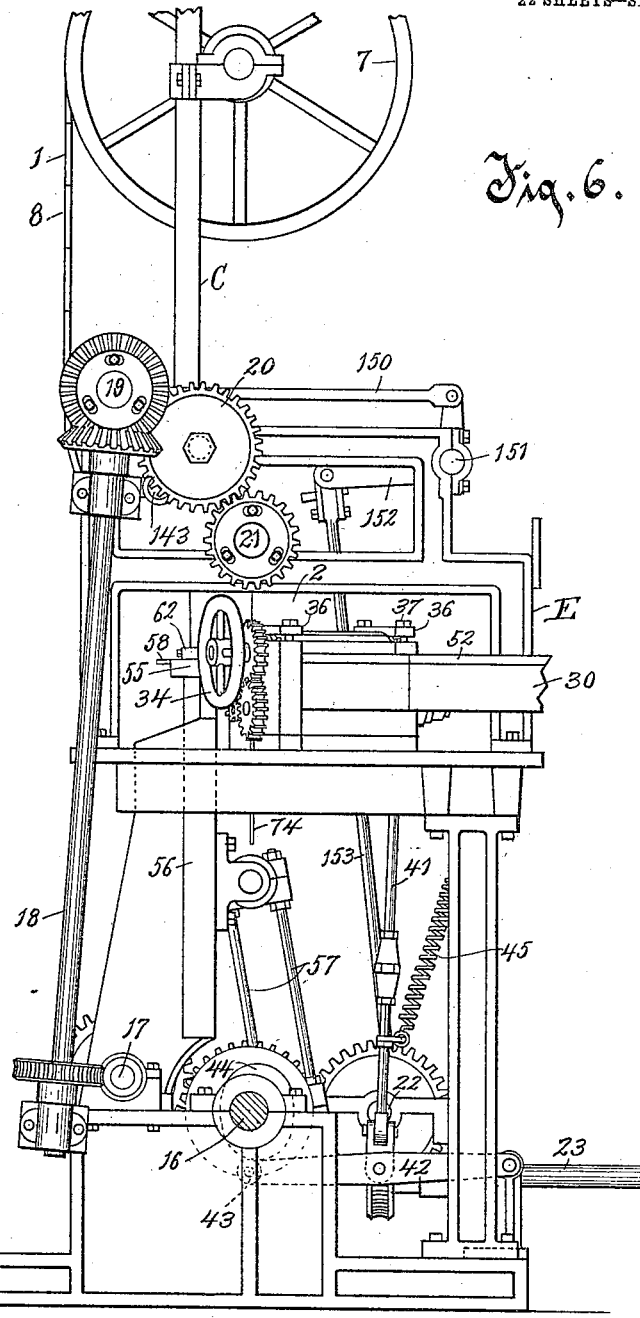
Figure 7:
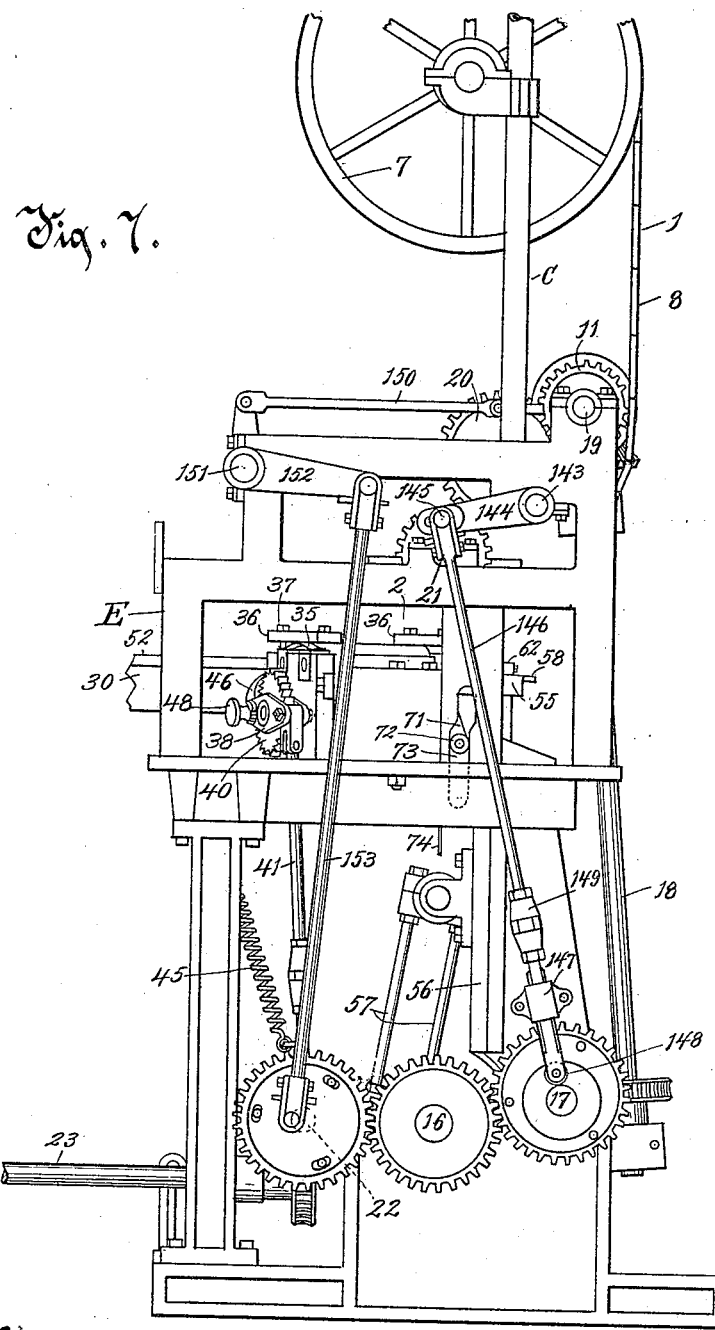
Figure 8:
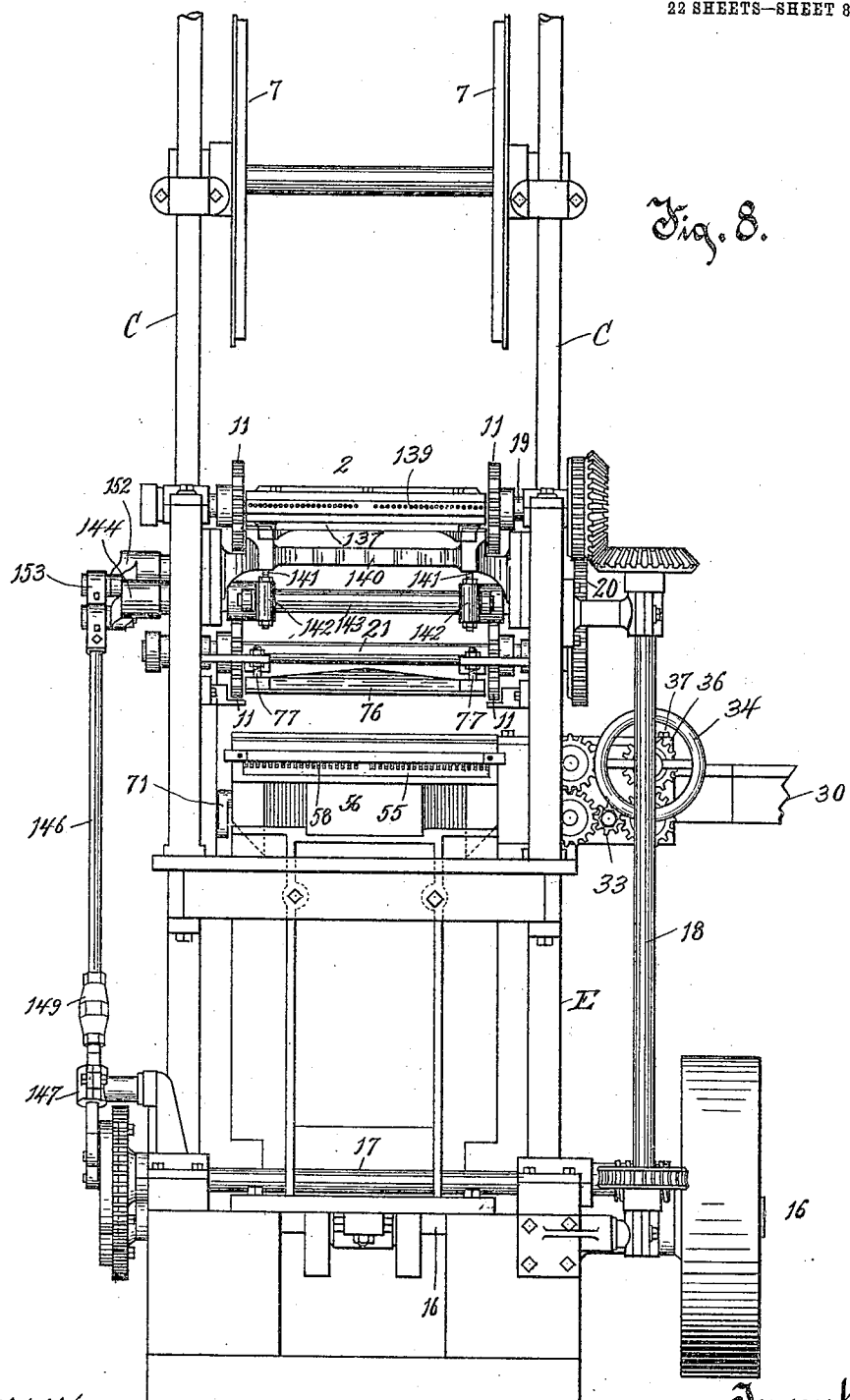
Figure 9:
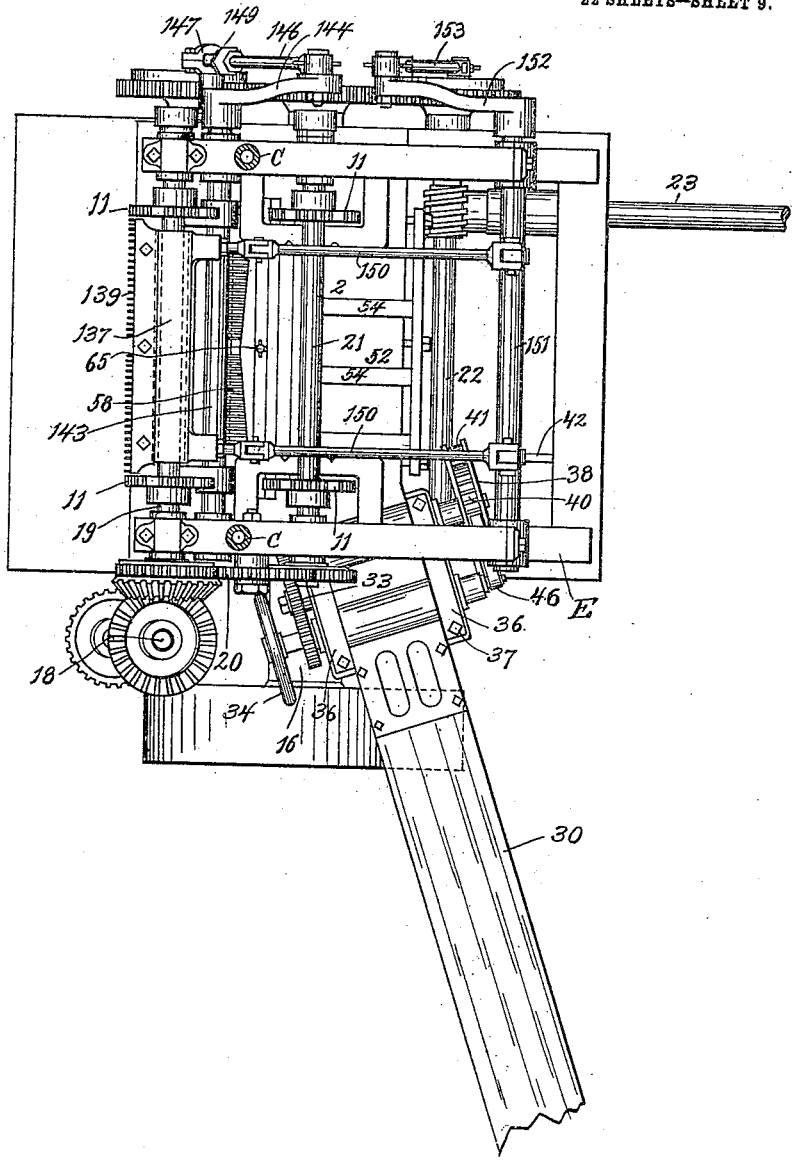
Figure 27:
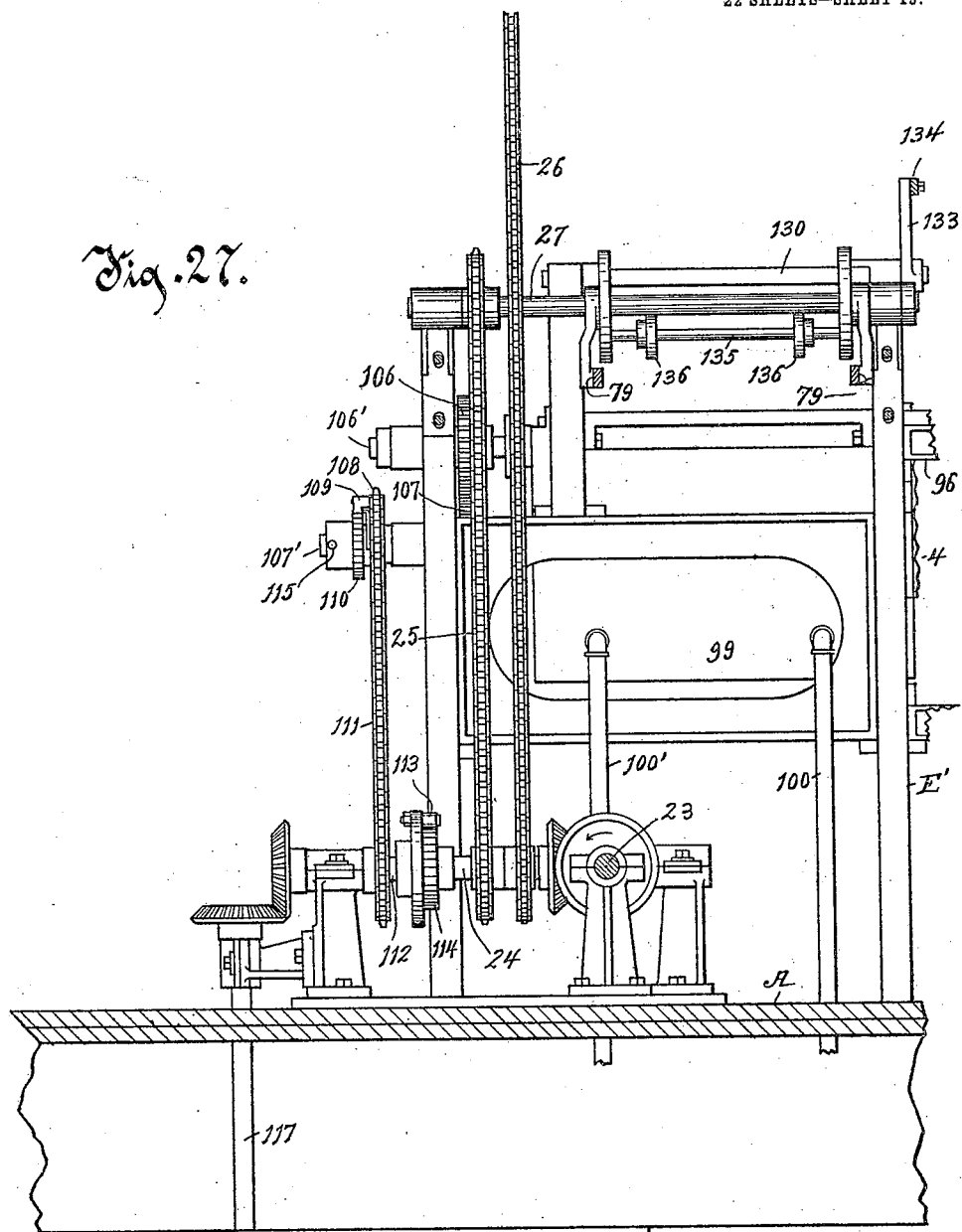
Figure 28:
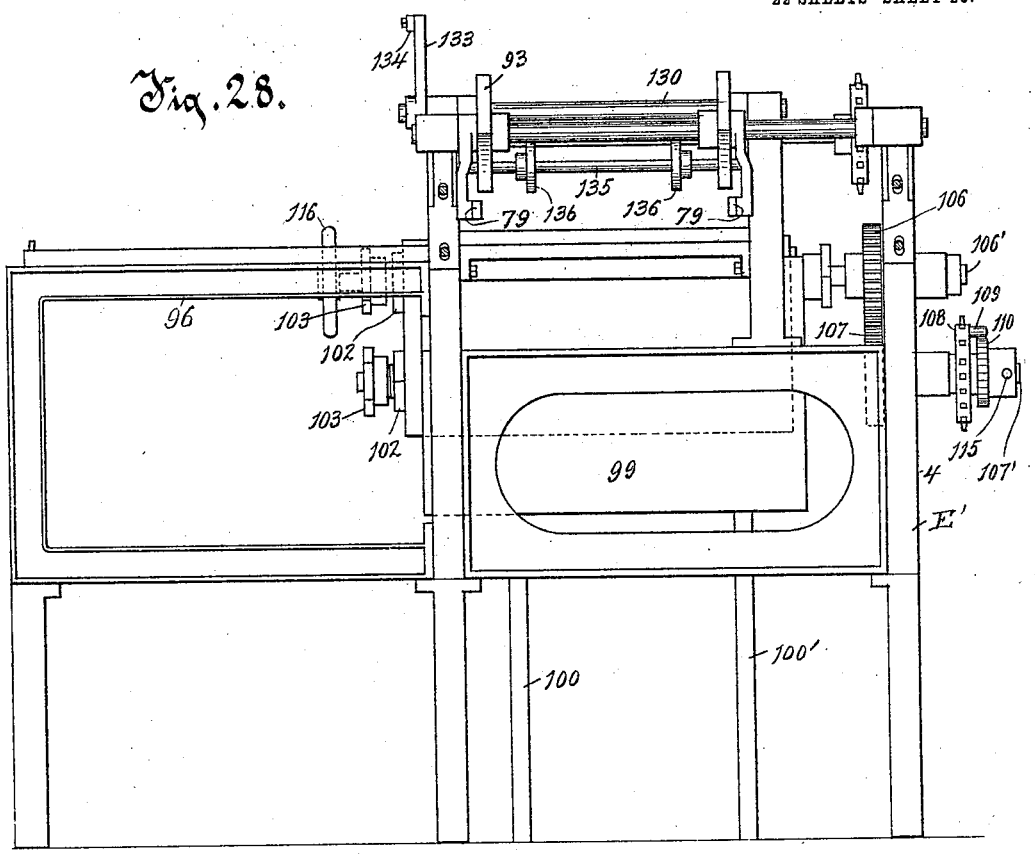
Figure 29:
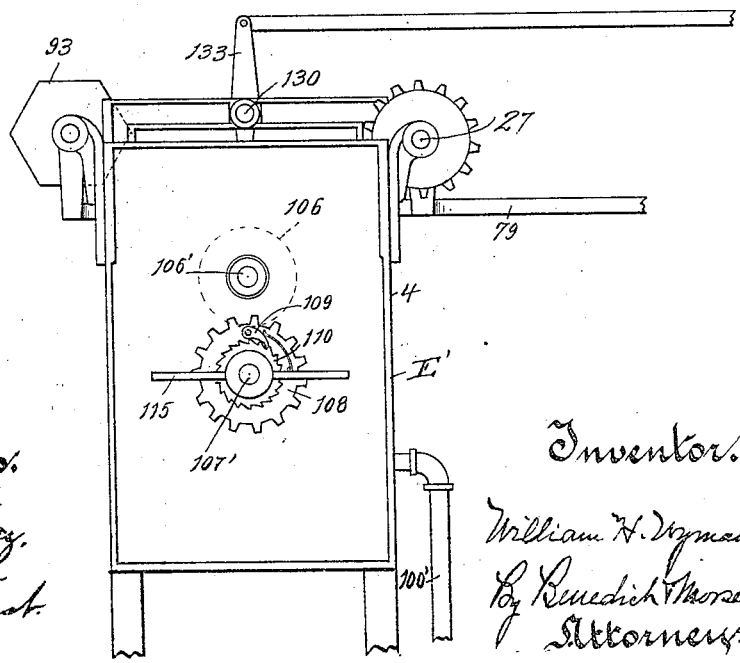
Figure 32:
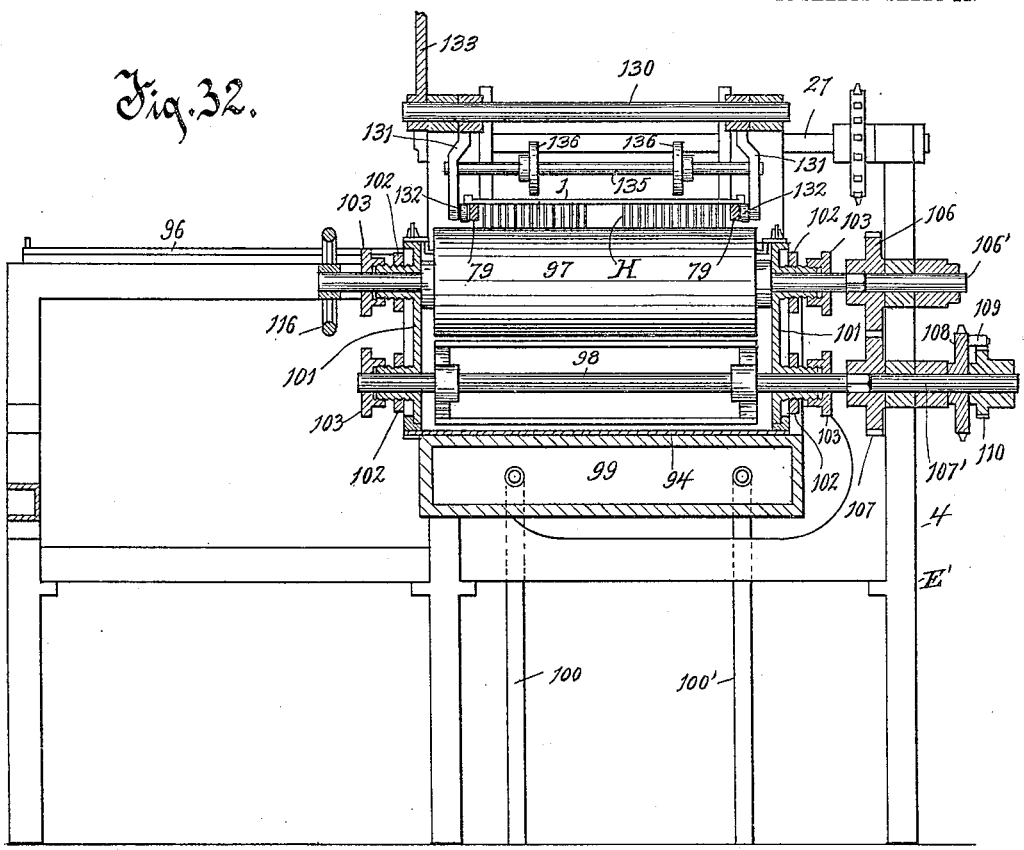
Figure 33:
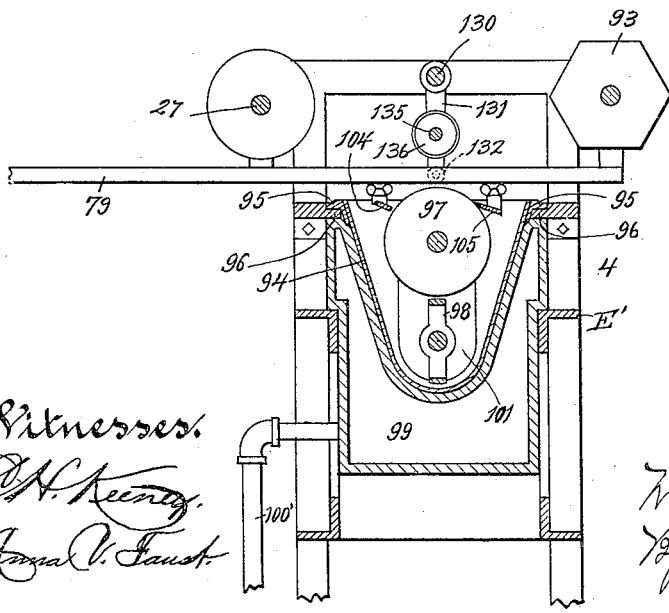

In the drawings, Figures 1, 2, 3, 4, and 5, placed alongside of each other consecutively, show in a general way a side elevation of a match-machine embodying my improvements. Fig. 6 is a side elevation, enlarged in scale, of mechanism (shown on smaller scale in Fig. 1) for driving the endless match-carrier and for cutting sticks from the blocks and incidental mechanism. Fig. 7 is a side elevation of the same general features that are shown in Fig. 6, but at the other side of the machine from Fig. 6. Fig. 8 is an elevation of mechanism at that end of the machine shown in Fig. 1 and substantially of the mechanism the two sides of which are shown in Figs. 6 and 7. Fig. 9 is a top plan view of devices and mechanism for feeding the wood blocks to the stick-cutting devices, features of the stick-cutting devices, the match-discharging devices, and mechanism for operating these devices, the construction thus shown in plan view being substantially that of the mechanism shown in Figs 6, 7, and 8. Fig. 10 is a central vertical section longitudinally of the machine of substantially the same mechanism shown in Figs. 6 to 9, inclusive. Fig. 11 is a top plan view of the devices and mechanism for feeding the wood blocks to the machine and for holding them in position during the cutting of sticks therefrom. Fig. 12 is a side elevation of the devices and mechanism shown in plan in Fig. 11 at that side that is toward the bottom of the sheet. Fig. 13 is an elevation of the devices and mechanism shown in Fig. 11 at that side that is toward the top of the sheet. Fig. 14 is a top plan view of devices and mechanism for supporting, guiding, and feeding the blocks to the cutters, the plan being of devices and mechanism forming parts of the devices and mechanism shown in Fig. 11, but that are underneath the parts chiefly shown in Fig. 11. Fig. 15 is a top plan view of the vertically-reciprocable cutter-head, the location and relation of which to other parts is shown in Figs. 8, 9, and 10. Fig. 16 is a front elevation of the cutter-head shown in Fig. 15. Fig. 17 is an elevation of the cutter-head, showing its relation to the block-supporting devices (shown in section) and the blocks thereon (also shown in section) being fed to the cutters, the position of the cutter-head with reference to the wood blocks being the one it has just at the completion of the cutting of sticks in its downward movement. Fig. 18 is a vertical section longitudinally of the machine, of the cutter-head, the block-supporting devices and blocks thereon, and of a fragment of the match-carrier, showing the disposition of the parts relative to each other, but in another position from that shown in Fig. 14, the position of the cutter-head being the one it has at the completion of its upward movement and on inserting the match-sticks in the carrier. Figs. 19 and 20 illustrate a cutter-bar in different positions and partly in section in the first instance. Fig. 21 is an edging-knife, one or more of which are secured to the cutter-head and are adapted for removing the thin unusable edges of the wood blocks. Fig. 22 is a plan view of a fragment of the endless plate-carrier adapted for receiving and carrying the sticks and matches. Fig. 23 is a front or rear edge view of one of the plates of the carrier. Fig. 24 is a side edge view of a fragment of the carrier with a fragment of one of the toothed wheels meshing with teeth on the carrier and adapted for moving it. Fig. 25 is a view, transversely of the machine and mostly in vertical section, of a pan for holding and supplying paraffin or similar burning material to the match-sticks and devices therewith for supplying the material to the pan and automatically maintaining a proper supply therein. Fig. 26 is a plan view of devices for clutching a belt-pulley to its shaft and for shifting a belt from a tight to a loose pulley and reversing that operation. Fig. 27 is an elevation of mechanism found at the right of the dotted line 27 27 in Fig. 2, being chiefly mechanism for moving the carrier and for driving the composition roller. Fig. 28 is an elevation, on enlarged scale, of mechanism shown centrally near the bottom in Fig. 2 and relating to or in close connection with the composition-pan and devices. Fig. 29 is a side elevation of substantially the same mechanism shown in Fig. 28 and at the other side from that shown in Fig. 2. Fig. 30 is a top plan view of substantially the same mechanism shown in Fig. 28. Fig. 31 is an elevation, on enlarged scale, of the same mechanism shown in Figs. 28, 29, and 30 and at that side of the mechanism shown also in Fig. 2. Fig. 32 is a central vertical section transversely of the mechanism substantially shown in Figs. 28 to 31. Fig. 33 is a central vertical longitudinal section of the same mechanism substantially as shown in Fig. 31.

The operative mechanism and devices of the match-machine may be supported in any suitable manner, either by a proper frame therefor or by attaching them to parts of a building, as most convenient or desirable.

In the drawings, A is the floor of a building, and B is a timber or girder at the ceiling, and C C are posts resting on the floor and extending to the ceiling, which posts are preferably stayed by horizontally-disposed rods or bars D D. The posts C C are utilized for supporting some parts of the mechanism, while other parts, especially the stick-cutting and sticking mechanism and the composition-pan and mechanism related thereto, are supported by suitable framing E E'.

A principal feature of the machine is the flexible endless carrier 1, made up of a series of perforated plates hinged together, that travels continuously when the machine is in operation on the pulleys and ways, by which it is supported and into which the match-sticks are inserted and by which they are carried past the apparatus for applying paraffin or similar burning material thereto and past the composition-pan, where the ignitible heads are put on the sticks, and thence for a long distance in the air, during which time the composition of which the heads is composed sets and hardens before the matches are discharged from the carrier. The carrier in its endless route after passing the stick-cutting and sticking mechanism at 2, Figs. 1, 10, runs thence to the pan 3, Figs. 1, 2, 25, for applying burning material, preferably paraffin, and thence to and past the ignitible composition-applying mechanism at 4, Figs. 2, 31, 32, and thence about a series of large open drums or pulleys 5 5, and thence returning in the upper portion of the room runs on ways 6, Figs. 2 to 5, and thereafter on the open drums or pulleys 7 7 to the stick-cutting and sticking mechanism. The drums 5 and 7 are mounted conveniently in boxes that are adjustable vertically, and thereby supported on the posts C. By this construction the tension of the carrier can readily be adjusted. The carrier 1 consists of metal plates 8, Figs. 22, 23, hinged together at their lateral ends and provided with laterally-disposed parallel rows of perforations 9 9, the perforations being of such size as adapts them to receive therein the sticks cut from the blocks of wood by the cutters, the sticks fitting snugly into the perforations, so as to be held in place in the carrier, projecting substantially at right angles from the plates. The rows of perforations in each plate are at equal distances apart, and the row of perforations nearest each edge of the plate is at an equal distance from the nearest row of perforations in the adjacent plate. The construction is such that the rows of perforations throughout the entire length of the carrier are at equal distances from the adjacent rows and parallel to each other. Along each edge of the carrier a toothed rack 10 is provided, the teeth at the hinge between two plates being of a width equal to two other teeth, and the cog-teeth wheels 11, that mesh with the racks 10, are provided with interdental spaces of double width to mesh with these double-width teeth of the racks, Fig. 24.

Figure 2:
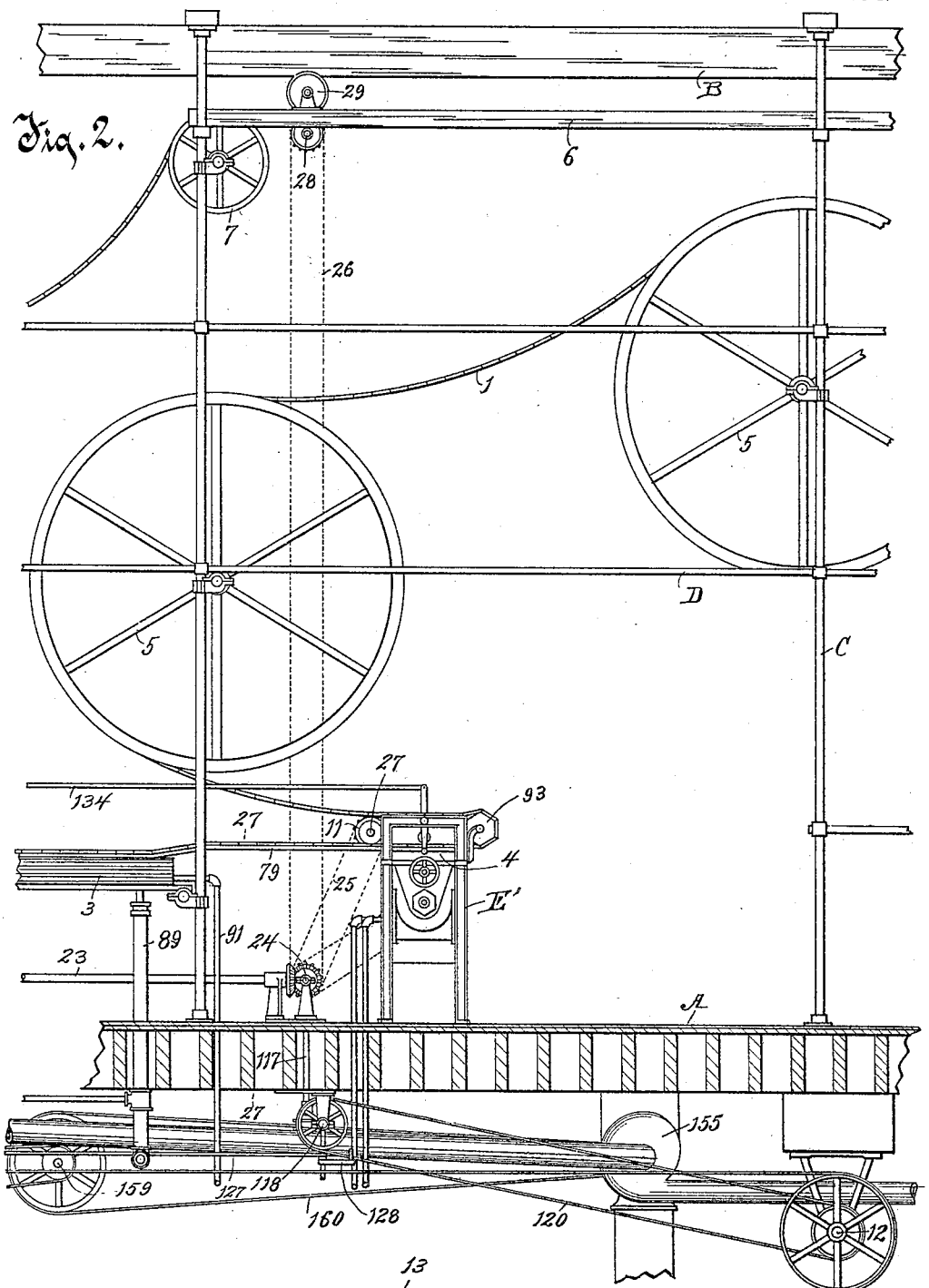
Figure 3:
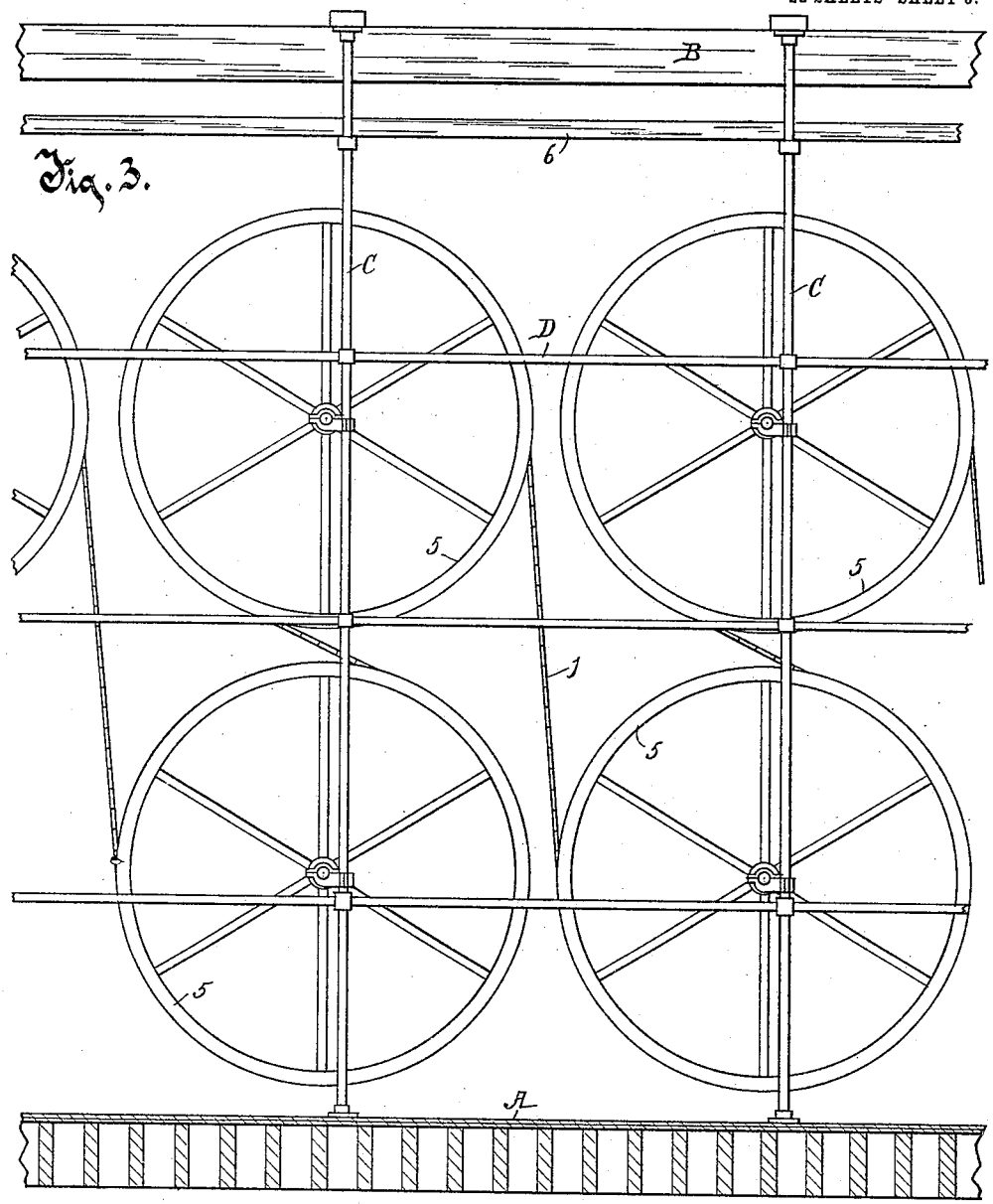
Figure 4:
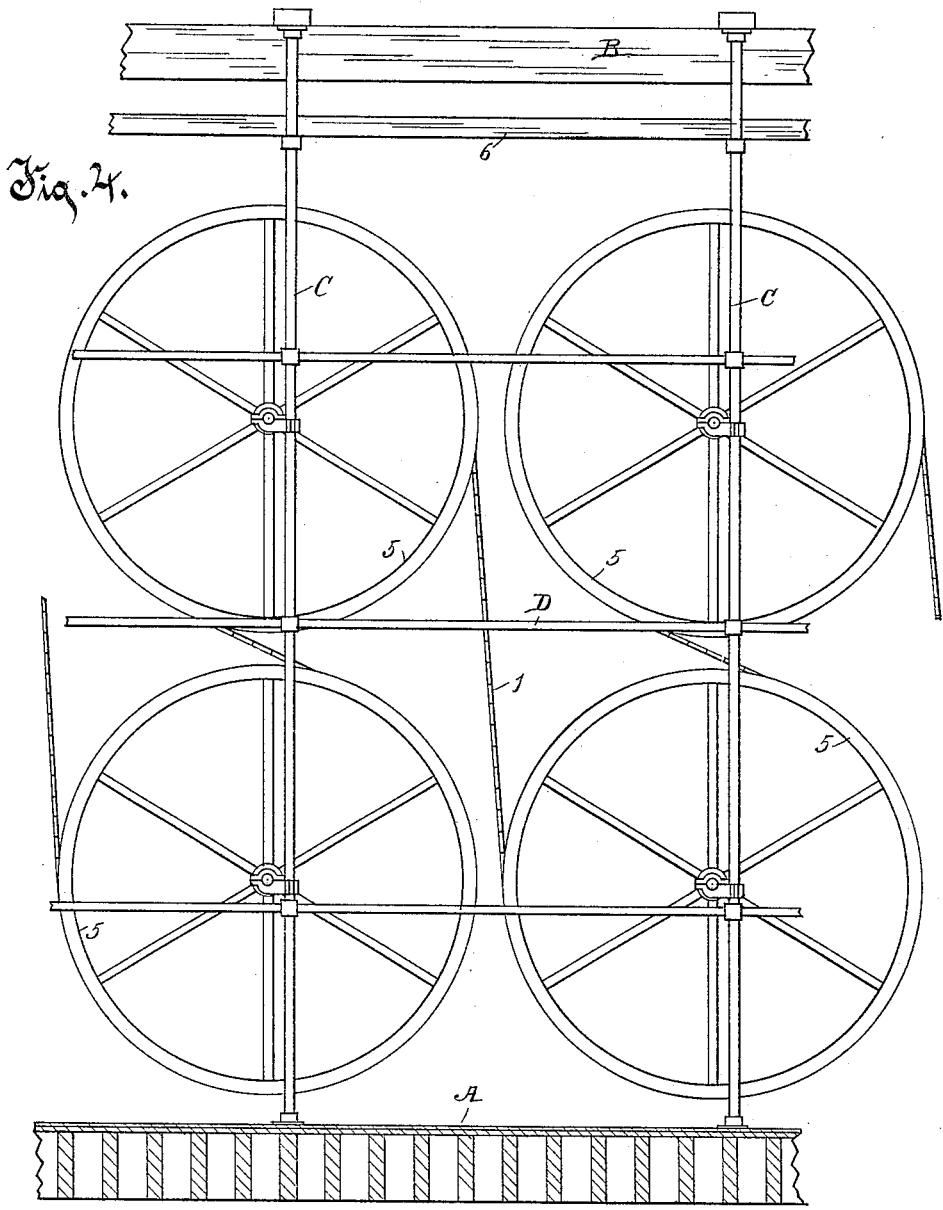

For driving the endless carrier the power-driven shaft 12, Fig. 2, is connected by a belt 13 to the shaft 14, and this shaft 14 is in turn connected operatively by the belt 15 to the shaft 16, Figs. 1, 2, the shaft 16 being geared to the shaft 17, Figs. 6, 7, 8, which is provided with a worm meshing with a worm-wheel on the upright shaft 18, which is geared to a horizontal shaft 19, Figs. 2, 6, 7, 8, 9, 10, provided with toothed rack-wheels 11, meshing with the racks on the carrier. The shaft 19 is also geared through the cogwheel 20 (mounted on a stud-pin) to the shaft 21, which is also provided with rack-toothed wheels that mesh with the racks on the carrier. The shaft 16 is also geared to the shaft 22, Figs. 7, 9, 10, which latter shaft is provided with a worm meshing with a worm-wheel on a shaft 23, said shaft 23 being geared to the shaft 24, Figs. 1, 2, 27, from which shaft 24 sprocket-chains 25 and 26 run, respectively, to the shafts 27 and 28, which shafts are each provided with rack-toothed wheels meshing with the racks on the carrier, the rack-toothed wheels on the shaft 27 meshing with the racks on the carrier below and also preferably above them. By the means just described the carrier is driven synchronously continuously throughout its entire length, no part of the carrier being moved intermittently, as has heretofore been common in match-machines of this general character. Opposite the shafts 21 and 27 the carrier is supported and travels on horizontal ways that hold it in position with reference to and always in mesh with the rack-toothed wheels on those shafts. Above the shaft 28 idle wheels 29 bear against the opposite surface of the carrier and so guide its travel that the racks thereon are in constant engagement with the wheels on shaft 28. The gear-wheels on shafts 19, 21, and 22 are secured thereto adjustable revolubly limitedly in the manner shown in the drawings, whereby the proper relations can be secured by adjustment of these wheels between them and related parts of the mechanism.

For feeding the wood blocks, that have been cut to proper length, to the stick-cutters of the machine a horizontally-disposed feed box or trough 30 is provided, Figs. 1, 9 to 14, which is disposed at an oblique angle to the line of motion of the carrier and which feed-box has, preferably, two channels or compartments separated by a vertical partition 31. This feed-box at its inner end terminates in a mouth oblique to the axis of the feed-box, but which is parallel to and immediately in front of the plane of the vertical travel of the stick-cutters. This feed-box is provided with two pairs of transversely-disposed parallel feed-rollers 32 32 and 32′ 32′, the rollers of each pair being arranged one above the other at such distance therefrom as to permit of the passage of the wood blocks between them. The two rollers of each pair are geared to each other at one end, and the lower rollers of the two pairs are geared to each other by an intermediate idle roller 33, Figs. 11, 13. One of the rollers is provided with a hand-wheel 34, whereby the rollers can be rotated limitedly by the attendant. The upper rollers of each pair are mounted in vertically-movable blocks and are held yieldingly to position by springs 35, the tension of the springs being also adjustable by means of the bars 36, against which the springs resist, the bars being adjustable toward and from the frame and the path of the blocks by means of the screw-threaded bolts 37 37, passing loosely through the bars. The feed-rolls are actuated intermittently by means of a lever 38, Fig. 12, pivoted on the extended journal of one of the rolls, which lever is provided with a pawl 39, pivoted in the free extremity thereof and adapted to engage in one direction the teeth of a ratchet-wheel 40, fixed on the journal of the roller. The other extremity of the lever 38 is connected by a link or rod 41, Figs. 6, 7, 12, to a lever 42 medially, which lever 42 is pivoted at one extremity to the frame and at the other extremity is provided with a roller-bearing 43, that rides on the periphery of an eccentric 44 on the shaft 16. This construction is adapted at each revolution of the shaft 16 to pull down on the lever 38 and rotate the wheel 40 to the extent of one of its notches, the lever and related devices being intermittently retrieved by the contracting-spring 45, attached to the frame and to the rod 41. A click 46 is adapted to prevent the rearward rotation of the wheel 40. The pawl 39 is held to its work yieldingly by a spring 47, and a knob 48 on the pawl 39 axially is provided for throwing the pawl 39 out of engagement with the wheel 40, and a click 49, pivoted on the lever 38, engages a ratchet-wheel 50 on the shank of the knob 48 and is adapted to hold the pawl 39 releasably out of engagement with the wheel 40. It will be understood that this construction is adapted to feed the wood blocks step by step intermittingly to the cutters, the relations of the mechanisms being such that the wood blocks are fed up into the path of the cutter-head at a time when the cutter-head is elevated above the blocks.

The feed-rollers 32 32′ are located at a slightly-oblique angle to the path of the blocks in the feed-box 30, Fig. 14, the disposition of the rollers being such as by their action on the blocks to feed them forward toward the cutters and at the same time to push them toward the longer side walls of the channels of the feed-box, and springs 51 51, secured to the shorter side walls of the channels of the feed-box, are adapted to push the blocks against and hold them to the longer side walls of the channels after they have passed the feed-rollers. A lid or plate 52, Figs. 10 to 13, secured by screws releasably to the feed-box, covers that portion of the box at and adjacent to the feed-rolls and in front of the cutter-head and is adapted to retain the wood blocks loosely in the feed-box. A block-holding bar 53, movable vertically on pins fixed in the plate 52 and extending loosely through the bar, is adapted to rest yieldingly on the blocks along that edge thereof being presented to the cutters, and this bar 53 is held yieldingly to its work against the blocks by elastic arms 54, Figs. 11, 12, 13, 17, 18, secured at their rear extremities to the side of the feed-box and at their free front ends bearing against the bar 53.

For cutting match-sticks from the wood blocks and sticking them into the endless carrier a cutter-head 55, Figs. 8, 10, 15, 16, 17, 18, is provided, which is mounted on a vertically-extending bar-like stem 56, dovetailed in cross-section, that is reciprocable vertically in ways therefor in the frame. This head is reciprocated by a pitman 57, conveniently constructed of two parallel rods provided with bearing-block heads at their two extremities, the head at one extremity being pivoted on the cutter-head stem 56 and at the other end being jointed eccentrically on the shaft 16. For cutting the match-sticks from the wood blocks a number of cutter-bars 58, each provided with a cutter 59 about a transverse aperture through the cutter-bar at a right angle to its length, are placed in grooves therefor in the cutter-head 55, the bars being so disposed in the cutter-head that the cutters project laterally in a homogeneous series slightly in front of the front edge of the cutter-head. A retaining-plate 60 is placed on the cutter-head over the cutter-bars and the plate is secured to the cutter-head by bolts. Pins 61 are inserted through the cutter-bars 58 medially at the rear of the retaining-plate 60 and into the cutter-head 55. A retaining-block 62 is placed on the cutter-head at the rear of the plate 60 and behind the pins 61 and is held up to the pins, which are thereby held against the retaining-plate 60 by screws 63, turning through rearwardly-extending and inwardly-projecting ends of the plate 60 against the rear edge of the block 62. A pin-plate 64, placed over the ends of the pins 61, is secured releasably to the block 62 by thumb-screws 65, and thereby the pins 61 are prevented from escaping from their seats. Trimming-knives 66, Figs. 16, 21, secured to the cutter-head substantially in the manner of the cutter-bars, project laterally therefrom adjacent to and substantially like the cutters 59 and are adapted for trimming off the thin wedge-like edges of the wood blocks by the same motion of the cutter-head that cuts the sticks from the blocks. A vertically-disposed plate 67, secured to the front edge of the retaining-plate 60, is provided with a series of grooves extending upwardly above and registering with the cutters 59, which grooves are adapted to receive the sticks after they are cut by the cutters, the plate holding them in upright position and in proper alinement to be inserted by the upward motion of the cutter-head into the perforations in the plates of the carrier 1 above. It is desirable that the match-sticks should be held firmly against the guide-plate 67, and for this purpose the cutter-head 55 is provided with an inclined top surface, in which the cutter-bar grooves are formed, so that the cutter-bars incline downwardly slightly toward the rear, whereby the apertures through the cutters and the cutter-bars are tilted inwardly a little toward the plate 67, and as these match-stick apertures through the cutters and cutter-bars are substantially of equal diameter throughout their lengths the match-sticks are caused to pass through them at a slightly-oblique angle to the perpendicular, whereby their upper ends are made to hug closely in the grooves of the plate 67. A push-bar 68, slidable in ways therefor in the cutter-head and located just beneath the front extremities of the cutter-bars 58, is adapted to be moved out directly beneath the cutters 59 after the match-sticks have been cut from the blocks and to remain in that position during the upward movement of the cutter-head, furnishing a resistance against the downward movement of the sticks through the cutters and push them into the carrier as the cutter-head moves upwardly to the limit of its travel. When the cutter-head goes down, the push-bar 68 is moved inwardly underneath the cutter-bars out of the path of the cutters. For this purpose a rock-shaft 69, mounted in the cutter-head, is provided with radial arms 70, the free rounded extremities of which enter sockets therefor in the push-bar 68, and a crank-arm 71 on the rock-shaft 69 is provided with an antifriction-roller 72, that travels in a vertically-disposed slot 73, Fig. 7, in the frame, which slot is so offset or inclined laterally medially as to compel the oscillation of the shaft 69 and the corresponding shifting of the push-bar 68 as the cutter-head reciprocates vertically.

A vertically-disposed sheet-metal apron or wall 74, secured to the cutter-head and its stem, forms a wall that prevents the forward moving of the wood blocks F F when the cutter-head has passed upwardly beyond them and also forms a wall for the air-chamber G below the feed-box. A series of short upright pins 75, Figs. 13, 14, 17, 18, fixed in a sill located at and secured to the discharging edge of the bottom of the feed-box, are so disposed as to register with the cutters 59 and to enter the apertures thereof a little at the end of the downward travel of the cutter-head and push the match-sticks upwardly therein, so as to surely and completely sever the match-sticks from the wood blocks. The movement of the cutter-head is so adjusted as to provide for this connection.

It will be understod that the match-sticks H H are cut from the blocks F by the cutters 59 as the cutter-head goes down and that as the cutter-head goes up the push-bar 68 is moved outwardly underneath the lower ends of the match-sticks, and they are carried up and inserted in a row of the perforations in the carrier 1. The adjustment and movements of the machine are such that the head going up takes the upper ends of the matchsticks directly into a row of the perforations in the carrier, and it should be understood that the slight movement forwardly of the carrier during the brief period occurring while the match-sticks are being inserted into it merely moves the upper ends of the matchsticks slightly forward and away from the guide-plate 67 without in any wise disturbing the relation of the parts of the machine or unduly bending the match-sticks, which remain firmly in the carrier and are withdrawn from the cutters as the cutter-head goes down.

A portion of the carrier 1 at and adjacent to the locality at which the match-sticks are inserted in it rests and travels on ways therefor on the frame, Fig. 10. The carrier at the locality of inserting the match-sticks in it is held to its travel on these ways and against being lifted by the upward thrust of the matchsticks by an abutment-bar 76, Figs. 10, 18, which is disposed transversely of the carrier just above it and is secured in position adjustably by means of the screw-threaded bolts 77, fixed in laterally-projecting terminal heads of the bar 76 and extending upwardly therefrom loosely through the frame, in which frame they are secured adjustably by nuts turning on these bolts above and below the frame. By this construction the abutment-bar 76 can be raised or lowered at one or both ends and can be slightly moved or tilted toward the front or rear to adjust it suitably in relation to the thereunder-moving carrier.

From the stick-sticking mechanism the carrier 1, supported on ways 78, Fig. 1, runs to a pan 3, holding paraffin or liquid-burning material, above and past which pan it runs on ways therefor and thence to and along other ways 79 to the ignitible composition-applying mechanism at 4, Fig. 2. The pan 3, holding the burning material, usually paraffin, is an elongated pan set in a steam or hot-water bath pan 80, Fig. 25. The carrier 1 as it passes the pan 3 is so disposed with reference to the pan that the match-sticks depending from the carrier project into the supply of liquid-burning material in the pan, and the sticks are thereby coated and to some extent saturated with this material. It is desirable that the supply of the liquid material shall be maintained in this pan notwithstanding the amount that is being constantly used to saturate and coat the matchsticks, and for this purpose I connect the bottom of the pan by a pipe 81 to the bottom of a distant supply-tank 82, which supply-tank is fixed at the same level as the pan 3, so that as the material is applied to the match-sticks and withdrawn from the pan 3 its place will be supplied by a corresponding amount of the liquid flowing thereto from the supply-tank 82. The supply-tank 82 is also kept constantly provided with the liquid material from a reservoir 83, located above the supply-tank 82 and connected thereto by a pipe 84, discharging into the supply-tank. The pipe 84 is provided with a shut-off valve 85, provided with laterally-extending arms, one of which is provided with a float 86, connected to the valve-arm by a rod, the float being so disposed as to go down as the liquid material is withdrawn from the tank 82, and thereby to open the valve 85, permitting a supply of the material to flow into this tank from the reservoir 83, and as the material in the tank 82 rises to the proper height therein and correspondingly in the pan 3 the float 86 rises and closes the valve 85, shutting off a further flow of the material into the tank 82 until the float 86 again goes down by reason of the withdrawal of material from the tank. An adjustable weight 87 on a reversely-extending arm of the valve 85 counterbalances the float 86. A steam or hot-water pipe 88 furnishes a supply of steam or hot water to the bath 80 and also to the chamber inclosing pipe 89 about the pipe 81 and to the bath 90 below and about the supply-tank 82. A discharge-pipe 91, leading from the bath 80, disposes of the excess or used steam or hot water. A steam or hot-water coil 92 in the reservoir 83 is adapted for heating and liquefying the material in the reservoir.

The carrier 1 runs on the ways 79 past the composition-applying mechanism to and turns about the open-frame-faced drum 93, Figs. 2, 31, 33, mounted in stationary brackets therefor on the frame. A composition-holding pan 94, Figs. 2, 28–33, is provided with horizontally-disposed ribs or lips 95, resting on ways 96 therefor on the frame, by means of which the pan is adapted to be pushed under the path of travel of the carrier or withdrawn laterally therefrom on the ways. A composition-supplying roller 97 is mounted in the pan 94 in such position as to be just below and transversely of the path of the carrier when the pan is in position under the carrier, the roller being at such distance from the carrier that the match-sticks being carried by the carrier will extend down and so close to the roller as to dip into the composition on the surface of the roller as the carrier passes it, Fig. 32. A rotatable composition-stirrer 98 below the roller 97 is mounted in the pan 94 and is adapted to stir the composition while the machine is in operation and maintain the proper consistency of it. The composition-pan 94 is set loosely in the top surface of a closed steam or hot-water bath 99, which is adapted to keep the composition material in proper liquefied form and condition. The bath is supplied with and discharged of steam or hot water by means of the pipes 100 and 100'. The journals of the roller 97 and the stirrer 98 have their bearings at each end in boxes therefor, constructed integrally in detachable plates 101 101, covering vertical slots in the heads of the composition-pan and secured to the composition-pan by nuts 102, turning on the screw-threaded exterior surfaces of the boxes against the heads of the pan, whereby the box-plates are clamped to the pan-heads and close the slots therein. Screw-threaded collar-caps 103 about the journals of the roller 97 and the stirrer 98 turn by their screw-threads onto the ends of the boxes on the plates 101 and form packing-chambers or stuffing-boxes around the journals. A spreader 104, secured detachably to the pan 94 near to the roller 97, is adapted to spread the composition thereon as it is carried up by the rotation of the roller from the supply of material in the pan and regulate and adapt the thickness thereof on the roller properly for suitable application thereof to the ends of the match-sticks. A scraper 105, also secured detachably to the pan, is so disposed as to remove all the remaining composition from the surface of the roller after it has passed the ends of the sticks and discharge this remaining composition into the pan.

For connecting the roller 97 and the stirrer 98 operatively to the driven mechanism for rotating them two gear-wheels 106 107, fixed on shafts 106' and 107', respectively, are located opposite the journals of the roller 97 and the stirrer 98 and are so mounted in the frame as to mesh with each other. The hubs of the wheels 106 and 107 are provided with squared or faced sockets axially, into which the correspondingly squared or faced extremities of the journals of the roller 97 and the stirrer 98 are adapted to enter when the pan 94 is in position under the path of the carrier and whereby the roller and the stirrer are secured rotatively to the shafts 106' and 107', respectively, which are practically continuations of the journals of the roller and the stirrer. A sprocket-wheel 108, loose on the shaft 107', is held to rotation therewith in one direction by a spring-actuated pawl 109, Figs. 27, 28, 29, 32, engaging in one direction a ratchet-wheel 110, fixed on the shaft 107'. A chain belt 111 runs on the sprocket-wheel 108 and also on a wheel on a shaft 112, mounted in the frame opposite to and so practically to be an extension of shaft 24, the shaft 112 being provided with a pawl 113, adapted to engage a ratchet-wheel 114 on the shaft 24, whereby the rotation of the shaft 24 in one direction correspondingly rotates the shaft 112. Therefrom through the chain belt 111 the stirrer 98 and the roller 97 are rotated when the machine is in operation. By means of a crank-handle 115, Figs. 28, 30, on the shaft 107', and because of the slip connection between that shaft and the sprocket-wheel 108, the stirrer and the roller can be rotated by hand when desired. Also a hand-wheel 116, Figs. 30, 31, 32, on the journal of the roller 97 is a means whereby the attendant can rotate the roller, when the roller and stirrer are out of connection with the shafts 106' and 107', or can rotate the roller and the stirrer on that side of the machine in substantially the same manner as they can be rotated by the crank-handle 115.

It is sometimes desirable to operate the roller when the carrier and related mechanism are not in operation, and to provide therefor the shaft 112 is geared to a shaft 117, provided with a worm-wheel meshing with a worm on shaft 118, Figs. 2, 26, 27, the shaft 118 being provided with fast-and-loose pulleys 119 119', from which a belt 120 runs to a pulley fixed on the power-shaft 12. The pulley 121, on which the belt 15 runs, is loose on the shaft 14, Figs. 1, 26. A radially-spreading clutch on shaft 14 is adapted to engage the pulley 21 and hold it to rotation with the shaft 14. A clutch-collar 122, splined on the shaft 114, is provided with a shifting lever 123, connected at its other extremity to a radial arm 124, fixed on a rock-shaft 125. This rock-shaft 125 is provided with a radial arm 126, that is connected by a rod 127 to a bell-crank 128, another arm of which bell-crank is provided with a shifting rod 129, provided with pins, between which the belt 120 runs and by means of which the belt 120 is shifted from the tight pulley 119 to the loose pulley 119'. By means of this rock-shaft 125 and the devices connected thereto the attendant can release the pulley 121 from the shaft 14, thereby disconnecting the mechanism operated through the shaft 16 and at the same time putting the belt 120 onto the tight pulley 119, whereby the roller 97 and the stirrer 98 will be put in motion directly from the driving-shaft 12, thus providing for operating the devices in the composition-pan while the principal machine is at rest.

It is sometimes desirable when the endless carrier 1 is traveling to lift it away from the roller 97, and for this purpose a rock-shaft 130, mounted in the frame, is provided with depending arms 131, having thereon rollers 132, that are located just beneath the edges of the carrier 1, so that by oscillating the shaft 130, and thereby slightly uptilting the arms 131, the carrier is lifted away from the composition-roller 97 and from the ways 79, traveling temporarily on the rollers 132. For oscillating the shaft 130 a radial arm 133 is provided with a rod 134, by means of which the attendant can lift the carrier away from the composition-roller 97 without lifting or moving any other parts of the mechanism. A revoluble shaft 135, mounted in the arms 131, is provided with disks or wheels 136, located a little above the carrier 1 and adapted to prevent its undue uplifting at this locality.

After the sticks being carried by the carrier are supplied with ignitible composition at the composition-pan 4, thereby completing the matches except drying the composition, the matches are carried a long distance through the air, the carrier running on and about numerous drums or pulleys 5, Figs. 2, 3, 4, 5, and along on the ways 6, finally returning near to the locality at which the sticks were inserted in the carrier, and the matches are there pushed out of the carrier, and thereby discharged therefrom. The devices and mechanism for this purpose are shown in Figs. 1, 6, 7, 8, 9, and 10. A transversely-disposed ejecting-head 137 is provided at its front end with a dovetailed groove in which is inserted releasably a bar 138, provided with a row of pins 139, corresponding in number and arranged to register with the several rows of apertures 9 in the plates 8 of the carrier. The head 137 rests and reciprocates toward front and rear on the transversely-disposed ancillary frame 140, which ancillary frame is reciprocable vertically in ways therefor on the main frame. The ancillary frame 140 is supported adjustable vertically on screws 141, extending through and adjustable in blocks 142 by nuts turning on the screws against the blocks. The blocks 142 are provided with apertures slightly elongated horizontally, in which the wrist-pins on crank-arms enter, the crank-arms being fixed on shaft 143, journaled in the frame. The rock-shaft 143 is provided with a crank-arm 144, having a wrist-pin 145 secured adjustably therein toward and from the shaft 143. A reciprocable rod 146, wristed on the pin 145, travels endwise in ways 147 therefor, fixed on the frame, the other extremity of the rod 146 being provided with a pin and a roller 148, adapted to travel in an eccentric annular groove therefor in a disk or wheel on the shaft 17. By this construction the ejector-head 137 is given a vertical reciprocable movement, the downward portion of the reciprocation being synchronous with the movement of the carrier adjacent thereto, whereby when the pins 139 are being pushed into and withdrawn from a carrier-plate the pin-carrying head moves downwardly correspondingly with the carrier. A reversely-threaded nut or turnbuckle 149 turns on the two parts of the rod 146 and is adapted for adjusting the length of the rod.

For reciprocating the head 137 horizontally rods 150, jointed medially, so as to be capable of a hinge movement vertically, are secured at one extremity to the head 137 and at their other extremities are connected to crank-arms on a rock-shaft 151, which rock-shaft is provided with another crank-arm 152, which in turn is connected by a rod 153 to a wrist-pin on a disk or wheel on shaft 22. By this construction the ejector-head 137 is given a reciprocable movement that carries the pins 139 regularly into each succeeding row of apertures 9 in the carrier 1, as the row comes in front of the pins, and the matches in the carrier are thereby pushed out of and discharged from the carrier. The construction and disposition of the parts is such that the ejector-pins 139 are always in a plane at a right angle to the plane of the carrier when at that part of its travel, and so that the ejector pins in discharging the matches from the carrier-plates enter and are withdrawn from the match-holding perforations 9 in the plates 8 in the straight lines of the axes of these perforations. No devices for catching and arranging and boxing the matches are shown, as any of the well-known devices in use for a similar purpose may be employed therefor.

For removing dust, splinters, and broken sticks from the vicinity of the cutting mechanism a suction and blast pipe 154 is employed, which leading from the immediate vicinity of the cutters runs thence to a fan, located at 155, and therefrom to a dust and splinter chamber 156, from which discharge-pipes lead away to a place of deposit. A belt 157, Figs. 1, 2, 26, running on a pulley 158 on shaft 14, runs also on a small pulley on shaft 159, and another belt 160, running on a larger pulley on shaft 159, runs also on the axle of the fan at 155. By this method of belting up the fan its rapid rotation is obtained.

The operation of the entire machine will be clearly understood from the foregoing description of its parts and the statements made in connection therewith of the purpose of the mechanism and devices and their several modes of operation. The complete machine, by reason of its being constructed and adapted for a continuous movement of the carrier into the plates of which the sticks are inserted and from which the matches are discharged during the continuous travel of the carrier, obviates some mechanism in and therefore has advantages over machines having some similarity to this one, but which as heretofore constructed have been so built that a part at least of the match-carrier was moved intermittently to provide for inserting match-sticks into the carrier and discharging the matches therefrom during the intervals of rest of the carrier.

What I claim as my invention is—

1. In a match-machine, the combination of a vertically-reciprocable stick-cutting and stick-sticking head provided at its front with a vertically-disposed grooved guide-plate face and with cutter-bar grooves extending rearwardly from the front and inclined downwardly rearwardly, and cutter-bars having cutters at their ends about apertures transversely through the bars substantially at right angles to the length of the bars, said bars being secured to the cutter-head in said oblique grooves, the cutter-bars and the cutter-bar apertures being at oblique angles to the motion of the cutter-head and to the grooved face of the cutter-head so that sticks cut by the cutters and forced through the cutter-bar apertures are thrust at an oblique angle against the guide-face.

2. In a match-machine, the combination with a frame having horizontally-disposed ways above a composition-roller, and a flexible stick-carrying carrier normally supported and adapted to travel on said ways, of means for raising said carrier temporarily from the ways, comprising a rock-shaft above said carrier, radial depending arms on said rock-shaft provided with rollers under the carrier, and a rod attached to a radial arm on the rock-shaft by which the shaft can be oscillated and the carrier raised.

3. In a match-machine, the combination with a frame provided with fixed horizontally-disposed ways and a flexible stick-carrying carrier supported and traveling thereon, of a composition-supplying roller mounted below and adjacent to said carrier, a composition-pan in which said roller is mounted rotatably and removably, said pan being supported and slidable endwise on the frame from beneath the carrier, and means for lifting the carrier temporarily from the ways and away from the composition-roller.

4. In a match-machine, the combination with a driven shaft, an adjacent shaft in the same axial line, and a pawl on one of said shafts engaging a ratchet-wheel on the other shaft providing for slip motion in one direction, of a chain belt running on the second-named shaft and on a wheel loose on a shaft connected operatively to the composition-manipulating mechanism, said last-mentioned shaft, and a pawl and ratchet connecting said shaft and loose wheel thereon operatively in one direction.

5. In a match-machine, the combination with a driven shaft, an adjacent shaft in the same axial line, and a pawl on one of said shafts engaging a ratchet-wheel on the other shaft providing for slip motion in one direction, of a chain belt running on the second-named shaft and on a wheel loose on another shaft connected operatively to the composition-manipulating mechanism, a third shaft geared to the second-named shaft, a fourth shaft geared by a worm to said third shaft, and a belt connecting the fourth shaft operatively to a driving-shaft other than the one to which the first-named shaft is geared.

6. In a match-machine, the combination with the main frame and a movable carrier thereon of an ejector-carrying ancillary frame reciprocable vertically on the main frame, a rock-shaft journaled in the main frame, arms projecting radially from the rock-shaft, blocks wristed on the radial arms of the rock-shaft, and screws adjustable in the blocks supporting the ancillary frame thereon.

7. In a match-machine, the combination with a continuously-movable match-carrier, of an ancillary frame reciprocable parallel with the movement of the carrier and synchronously therewith in one direction, a rock-shaft carrying said ancillary frame on its radial arms and provided with an actuating radial arm, a reciprocating rod pivoted on said actuating radial arm, ways in which said rod reciprocates, means for reciprocating the rod, and means for adjusting the length and throw of said rod.

In testimony whereof I affix my signature in presence of two witnesses.

WILLIAM H. WYMAN.

Witnesses:
ELLEN DRISCOLL,
C. T. BENEDICT.